(12) United States Patent
Leck et al.

(10) Patent No.: US 8,758,641 B2
(45) Date of Patent: *Jun. 24, 2014

(54) REFRIGERANT ADDITIVE COMPOSITIONS CONTAINING PERFLUOROPOLYETHERS

(71) Applicant: E I du Pont de Nemours and Company, Wilmington, DE (US)

(72) Inventors: Thomas Joseph Leck, Hockessin, DE (US); Thomas Frank Saturno, New Castle, DE (US); Gregory A Bell, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/833,524

(22) Filed: Mar. 15, 2013

(65) Prior Publication Data

US 2013/0199219 A1 Aug. 8, 2013

Related U.S. Application Data

(60) Division of application No. 13/241,540, filed on Sep. 23, 2011, now Pat. No. 8,426,657, which is a division of application No. 12/796,696, filed on Jun. 9, 2010, now Pat. No. 8,049,046, which is a division of application No. 11/827,256, filed on Jul. 11, 2007, now Pat. No. 7,759,532, which is a continuation-in-part of application No. 11/653,125, filed on Jan. 12, 2007, now abandoned.

(60) Provisional application No. 60/785,735, filed on Jan. 13, 2006.

(51) Int. Cl.
*C09K 5/04* (2006.01)

(52) U.S. Cl.
USPC .......................................................... 252/68

(58) Field of Classification Search
CPC ............................... C09K 5/04; C10M 107/38
USPC .......................................................... 252/68
See application file for complete search history.

(56) References Cited

U.S. PATENT DOCUMENTS

| | | | |
|---|---|---|---|
| 5,221,494 A | 6/1993 | Ikeda et al. | |
| 5,376,359 A | 12/1994 | Johnson | |
| 6,066,768 A | 5/2000 | Nappa et al. | |
| 6,221,273 B1 | 4/2001 | Basile et al. | |
| 6,260,380 B1 * | 7/2001 | Arman et al. | 62/646 |
| 6,982,173 B2 | 1/2006 | Marchionni et al. | |
| 7,759,532 B2 | 7/2010 | Leck et al. | |
| 8,049,046 B2 | 11/2011 | Leck et al. | |
| 8,188,323 B2 | 5/2012 | Leck et al. | |
| 8,426,657 B2 * | 4/2013 | Leck et al. | 570/175 |
| 2003/0040445 A1 | 2/2003 | Boyde | |
| 2004/0013610 A1 | 1/2004 | Dournel | |
| 2004/0119047 A1 | 6/2004 | Singh et al. | |
| 2004/0127383 A1 | 7/2004 | Pham et al. | |
| 2004/0256594 A1 | 12/2004 | Singh et al. | |
| 2004/0258594 A1 | 12/2004 | Andreasson et al. | |
| 2007/0105738 A1 | 5/2007 | Nappa et al. | |
| 2012/0011864 A1 | 1/2012 | Leck et al. | |

FOREIGN PATENT DOCUMENTS

| | | |
|---|---|---|
| EP | 0 432 273 A1 | 6/1991 |
| EP | 1 275 678 A2 | 1/2003 |
| EP | 1 306 417 A2 | 5/2003 |
| EP | 1 325 949 A2 | 7/2003 |
| WO | 02/38718 A2 | 5/2002 |

OTHER PUBLICATIONS

Jeanneaux, et al., Thermal Addition of 1-Iodoperfluoroalcanes to Perfluoroalkylethylenes, Journal of Fluorine Chemistry, 1974, pp. 261-270, vol. 4, Switzerland.
PCT International Search Report and Written Opinion mailed May 7, 2007.

* cited by examiner

*Primary Examiner* — John Hardee

(57) ABSTRACT

The present invention relates to compositions and processes of using perfluoropolyether to maintain or improve the oil return, lubrication, cooling capacity, or energy efficiency of a refrigeration, air conditioning or heat transfer system.

5 Claims, No Drawings

REFRIGERANT ADDITIVE COMPOSITIONS CONTAINING PERFLUOROPOLYETHERS

CROSS REFERENCE(S) TO RELATED APPLICATION(S)

This application is a divisional of and claims priority benefit of U.S. patent application Ser. No. 13/241,540, now U.S. Pat. No. 8,426,657, which is a divisional of and claims priority benefit of U.S. patent application Ser. No. 12/796,696, now granted as U.S. Pat. No. 8,049,046, which is a divisional of and claims priority benefit of U.S. patent application Ser. No. 11/827,256, now granted as U.S. Pat. No. 7,759,532, which is a continuation-in-part of U.S. patent application Ser. No. 11/653,125, filed Jan. 12, 2007, now abandoned, which claims the priority benefit of U.S. Provisional Application No. 60/758,735, filed Jan. 13, 2006.

BACKGROUND OF THE INVENTION

The present invention relates to compositions and processes for use in heat transfer, refrigeration and air-conditioning systems to improve the oil return, lubrication, energy efficiency, or reduce compressor wear, by using perfluoropolyether as an additive in the refrigerant or heat transfer fluid composition.

Lubricants have been used with the fluids in the heat transfer, refrigeration and air-conditioning systems to provide lubrication to the compressor and other moving parts and reduce compressor wear. However, not all the refrigerants or heat transfer fluids are compatible with all the lubricants. In particular, many HFC refrigerants or heat transfer fluids have poor miscibility or poor dispersibility with commonly used lubricants, such as mineral oil and alkylbenzene. Because the heat transfer fluids can not readily transport mineral oil lubricants through the heat exchangers, the lubricant oils accumulate on the surface of the heat exchange coils, resulting in poor oil return, poor heat exchange, low energy efficiency and the accelerated wear and tear of the compressors. As a result, the refrigeration and air conditioning industries have had to resort to the use of more expensive and more difficult to use synthetic lubricants such as polyesters and polyalkylene glycols.

Thus, there is a need for refrigerant additives to improve oil return, lubrication, energy efficiency, or reduce compressor wear while allowing the use of conventional mineral oil with refrigerants.

BRIEF SUMMARY OF THE INVENTION

The present disclosure provides a composition comprising:
a) a refrigerant or heat transfer fluid comprising at least one unsaturated fluorocarbon, selected from the group consisting of:
  (i) unsaturated fluorocarbons of the formula E- or Z-$R^1CH=CHR^2$, wherein $R^1$ and $R^2$ are, independently, $C_1$ to $C_6$ perfluoroalkyl groups;
  (ii) cyclic unsaturated fluorocarbons of the formula cyclo-$[CX=CY(CZW)_n$-], wherein X, Y, Z, and W, independently, are H or F, and n is an integer from 2 to 5; and
  (iii) unsaturated fluorocarbons selected from the group consisting of:
1,2,3,3,3-pentafluoro-1-propene ($CHF=CFCF_3$), 1,1,3,3,3-pentafluoro-1-propene ($CF_2=CHCF_3$), 1,1,2,3,3-pentafluoro-1-propene ($CF_2=CFCHF_2$), 1,2,3,3-tetrafluoro-1-propene ($CHF=CFCHF_2$), 2,3,3,3-tetrafluoro-1-propene ($CH_2=CFCF_3$), 1,3,3,3-tetrafluoro-1-propene$CHF=CHCF_3$), 1,1,2,3-tetrafluoro-1-propene ($CF_2=CFCH_2F$), 1,1,3,3-tetrafluoro-1-propene ($CF_2=CHCHF_2$), 1,2,3,3-tetrafluoro-1-propene ($CHF=CFCHF_2$), 3,3,3-trifluoro-1-propene ($CH_2=CHCF_3$), 2,3,3-trifluoro-1-propene ($CHF_2CF=CH_2$); 1,1,2-trifluoro-1-propene ($CH_3CF=CF_2$); 1,2,3-trifluoro-1-propene ($CH_2FCF=CF_2$); 1,1,3-trifluoro-1-propene ($CH_2FCH=CF_2$); 1,3,3-trifluoro-1-propene ($CHF_2CH=CHF$); 1,1,1,2,3,4,4,4-octafluoro-2-butene ($CF_3CF=CFCF_3$); 1,1,2,3,3,4,4,4-octafluoro-1-butene ($CF_3CF_2CF=CF_2$); 1,1,1,2,4,4,4-heptafluoro-2-butene ($CF_3CF=CHCF_3$); 1,2,3,3,4,4,4-heptafluoro-1-butene ($CHF=CFCF_2CF_3$); 1,1,1,2,3,4,4-heptafluoro-2-butene ($CHF_2CF=CFCF_3$); 1,3,3,3-tetrafluoro-2-(trifluoromethyl)-1-propene (($CF_3)_2C=CHF$); 1,1,3,3,4,4,4-heptafluoro-1-butene ($CF_2=CHCF_2CF_3$); 1,1,2,3,4,4,4-heptafluoro-1-butene ($CF_2=CFCHFCF_3$); 1,1,2,3,3,4,4-heptafluoro-1-butene ($CF_2=CFCF_2CHF_2$); 2,3,3,4,4,4-hexafluoro-1-butene ($CF_3CF_2CF=CH_2$); 1,3,3,4,4,4-hexafluoro-1-butene ($CHF=CHCF_2CF_3$); 1,2,3,4,4,4-hexafluoro-1-butene ($CHF=CFCHFCF_3$); 1,2,3,3,4,4-hexafluoro-1-butene ($CHF=CFCF_2CHF_2$); 1,1,2,3,4,4-hexafluoro-2-butene ($CHF_2CF=CFCHF_2$); 1,1,1,2,3,4-hexafluoro-2-butene ($CH_2FCF=CFCF_3$); 1,1,1,2,4,4-hexafluoro-2-butene ($CHF_2CH=CFCF_3$); 1,1,1,3,4,4-hexafluoro-2-butene ($CF_3CH=CFCHF_2$); 1,1,2,3,3,4-hexafluoro-1-butene ($CF_2=CFCF_2CH_2F$); 1,1,2,3,4,4-hexafluoro-1-butene ($CF_2=CFCHFCHF_2$); 3,3,3-trifluoro-2-(trifluoromethyl)-1-propene ($CH_2=C(CF_3)_2$); 1,1,1,2,4-pentafluoro-2-butene ($CH_2FCH=CFCF_3$); 1,1,1,3,4-pentafluoro-2-butene ($CF_3CH=CFCH_2F$); 3,3,4,4,4-pentafluoro-1-butene ($CF_3CF_2CH=CH_2$); 1,1,1,4,4-pentafluoro-2-butene ($CHF_2CH=CHCF_3$); 1,1,1,2,3-pentafluoro-2-butene ($CH_3CF=CFCF_3$); 2,3,3,4,4-pentafluoro-1-butene ($CH_2=CFCF_2CHF_2$); 1,1,2,4,4-pentafluoro-2-butene ($CHF_2CF=CHCHF_2$); 1,1,2,3,3-pentafluoro-1-butene ($CH_3CF_2CF=CF_2$); 1,1,2,3,4-pentafluoro-2-butene ($CH_2FCF=CFCHF_2$); 1,1,3,3,3-pentafluoro-2-methyl-1-propene ($CF_2=C(CF_3)(CH_3)$); 2-(difluoromethyl)-3,3,3-trifluoro-1-propene ($CH_2=C(CHF_2)(CF_3)$); 2,3,4,4,4-pentafluoro-1-butene ($CH_2=CFCHFCF_3$); 1,2,4,4-pentafluoro-1-butene ($CHF=CFCH_2CF_3$); 1,3,4,4,4-pentafluoro-1-butene ($CHF=CHCHFCF_3$); 1,3,3,4,4-pentafluoro-1-butene ($CHF=CHCF_2CHF_2$); 1,2,3,4,4-pentafluoro-1- butene (CHF=CFCHFCHF$_2$); 3,3,4,4-tetrafluoro-1-butene (CH$_2$=CHCF$_2$CHF$_2$); 1,1-difluoro-2-(difluoromethyl)-1-propene (CF$_2$=C(CHF$_2$)(CH$_3$)); 1,3,3,3-tetrafluoro-2-methyl-1-propene (CHF=C(CF$_3$)(CH$_3$)); 3,3-difluoro-2-(difluoromethyl)-1-propene (CH$_2$=C(CHF$_2$)$_2$); 1,1,1,2-tetrafluoro-2-butene (CF$_3$CF=CHCH$_3$); 1,1,1,3-tetrafluoro-2-butene (CH$_3$CF=CHCF$_3$); 1,1,1,2,3,4,4,5,5,5-decafluoro-2-pentene (CF$_3$CF=CFCF$_2$CF$_3$); 1,1,2,3,3,4,4,5,5,5-decafluoro-1-pentene (CF$_2$=CFCF$_2$CF$_2$CF$_3$); 1,1,1,4,4,4-hexafluoro-2-(trifluoromethyl)-2-butene ((CF$_3$)$_2$C=CHCF$_3$); 1,1,1,2,4,4,5,5,5-nonafluoro-2-pentene (CF$_3$CF=CHCF$_2$CF$_3$); 1,1,1,3,4,4,5,5,5-nonafluoro-2-pentene (CF$_3$CH=CFCF$_2$CF$_3$); 1,2,3,3,4,4,5,5,5-nonafluoro-1-pentene (CHF=CFCF$_2$CF$_2$CF$_3$); 1,1,3,3,4,4,5,5,5-nonafluoro-1-pentene (CF$_2$=CHCF$_2$CF$_2$CF$_3$); 1,1,2,3,3,4,4,5,5-nonafluoro-1-pentene (CF$_2$=CFCF$_2$CF$_2$CHF$_2$); 1,1,2,3,4,4,5,5,5-nonafluoro-2-pentene (CHF$_2$CF=CFCF$_2$CF$_3$); 1,1,1,2,3,4,4,5,5-nonafluoro-2-pentene (CF$_3$CF=CFCF$_2$CHF$_2$); 1,1,1,2,3,4,5,5,5-nonafluoro-2-pentene (CF$_3$CF=CFCHFCF$_3$); 1,2,3,4,4,4-hexafluoro-3-(trifluoromethyl)-1-butene (CHF=CFCF(CF$_3$)$_2$); 1,1,2,4,4,4-hexafluoro-3-(trifluoromethyl)-1-butene (CF$_2$=CFCH(CF$_3$)$_2$); 1,1,1,4,4,4-hexafluoro-2-(trifluoromethyl)-2-butene (CF$_3$CH=C(CF$_3$)$_2$); 1,1,3,4,4,4-hexafluoro-3-(trifluoromethyl)-1-butene (CF$_2$=CHCF(CF$_3$)$_2$); 2,3,3,4,4,5,5,5-octafluoro-1-pentene (CH$_2$=CFCF$_2$CF$_2$CF$_3$); 1,2,3,3,4,4,5,5-octafluoro-1-pentene (CHF=CFCF$_2$CF$_2$CHF$_2$); 3,3,4,4,4-pentafluoro-2-(trifluoromethyl)-1-butene (CH$_2$=C(CF$_3$)CF$_2$CF$_3$); 1,1,4,4,4-pentafluoro-3-(trifluoromethyl)-1-butene (CF$_2$=CHCH(CF$_3$)$_2$); 1,3,4,4,4-pentafluoro-3-(trifluoromethyl)-1-butene (CHF=CHCF(CF$_3$)$_2$); 1,1,4,4,4-pentafluoro-2-(trifluoromethyl)-1-butene (CF$_2$=C(CF$_3$)CH$_2$CF$_3$); 3,4,4,4-tetrafluoro-3-(trifluoromethyl)-1-butene ((CF$_3$)$_2$CFCH=CH$_2$); 3,3,4,4,5,5,5-heptafluoro-1-pentene (CF$_3$CF$_2$CF$_2$CH=CH$_2$); 2,3,3,4,4,5,5-heptafluoro-1-pentene (CH$_2$=CFCF$_2$CF$_2$CHF$_2$); 1,1,3,3,5,5,5-heptafluoro-1-butene (CF$_2$=CHCF$_2$CH$_2$CF$_3$); 1,1,1,2,4,4,4-heptafluoro-3-methyl-2-butene (CF$_3$CF=C(CF$_3$)(CH$_3$)); 2,4,4,4-tetrafluoro-3-(trifluoromethyl)-1-butene (CH$_2$=CFCH(CF$_3$)$_2$); 1,4,4,4-tetrafluoro-3-(trifluoromethyl)-1-butene (CHF=CHCH(CF$_3$)$_2$); 1,1,1,4-tetrafluoro-2-(trifluoromethyl)-2-butene (CH$_2$FCH=C(CF$_3$)$_2$); 1,1,1,3-tetrafluoro-2-(trifluoromethyl)-2-butene (CH$_3$CF=C(CF$_3$)$_2$); 1,1,1-trifluoro-2-(trifluoromethyl)-2-butene ((CF$_3$)$_2$C=CHCH$_3$); 3,4,4,5,5,5-hexafluoro-2-pentene (CF$_3$CF$_2$CF=CHCH$_3$); 1,1,1,4,4,4-hexafluoro-2-methyl-2-butene (CF$_3$C(CH$_3$)=CHCF$_3$); 3,3,4,5,5,5-hexafluoro-1-pentene (CH$_2$=CHCF$_2$CHFCF$_3$); 4,4,4-trifluoro-2-(trifluoromethyl)-1-butene (CH$_2$=C(CF$_3$)CH$_2$CF$_3$); 1,1,2,3,3,4,4,5,5,6,6,6-dodecafluoro-1-hexene (CF$_3$(CF$_2$)$_3$CF=CF$_2$); 1,1,1,2,2,3,4,5,5,6,6,6-dodecafluoro-3-hexene (CF$_3$CF$_2$CF=CFCF$_2$CF$_3$); 1,1,1,4,4,4-hexafluoro-2,3-bis(trifluoromethyl)-2-butene ((CF$_3$)$_2$C=C(CF$_3$)$_2$); 1,1,1,2,3,4,5,5,5-nonafluoro-4-(trifluoromethyl)-2-pentene ((CF$_3$)$_2$CFCF=CFCF$_3$); 1,1,1,4,4,5,5,5-octafluoro-2-(trifluoromethyl)-2-pentene ((CF$_3$)$_2$C=CHC$_2$F$_5$); 1,1,1,3,4,5,5,5-octafluoro-4-(trifluoromethyl)-2-pentene ((CF$_3$)$_2$CFCF=CHCF$_3$); 3,3,4,4,5,5,6,6,6-nonafluoro-1-hexene (CF$_3$CF$_2$CF$_2$CF$_2$CH=CH$_2$); 4,4,4-trifluoro-3,3-bis(trifluoromethyl)-1-butene (CH$_2$=CHC(CF$_3$)$_3$); 1,1,1,4,4,4-hexafluoro-3-methyl-2-(trifluoromethyl)-2-butene ((CF$_3$)$_2$C=C(CH$_3$)(CF$_3$)); 2,3,3,5,5,5-hexafluoro-4-(trifluoromethyl)-1-pentene (CH$_2$=CFCF$_2$CH(CF$_3$)$_2$); 1,1,1,2,4,4,5,5,5-nonafluoro-3-methyl-2-pentene (CF$_3$CF=C(CH$_3$)CF$_2$CF$_3$); 1,1,1,5,5,5-hexafluoro-4-(trifluoromethyl)-2-pentene (CF$_3$CH=CHCH(CF$_3$)$_2$); 3,4,4,5,5,6,6,6-octafluoro-2-hexene (CF$_3$CF$_2$CF$_2$CF=CHCH$_3$); 3,3,4,4,5,5,6,6-octafluoro1-hexene (CH$_2$=CHCF$_2$CF$_2$CF$_2$CHF$_2$); 1,1,1,4,4-pentafluoro-2-(trifluoromethyl)-2-pentene ((CF$_3$)$_2$C=CHCF$_2$CH$_3$); 4,4,5,5,5-pentafluoro-2-(trifluoromethyl)-1-pentene (CH$_2$=C(CF$_3$)CH$_2$C$_2$F$_5$); 3,3,4,4,5,5,5-heptafluoro-2-methyl-1-pentene (CF$_3$CF$_2$CF$_2$C(CH$_3$)=CH$_2$); 4,4,5,5,6,6,6-heptafluoro-2-hexene (CF$_3$CF$_2$CF$_2$CH=CHCH$_3$); 4,4,5,5,6,6,6-heptafluoro-1-hexene (CH$_2$=CHCH$_2$CF$_2$C$_2$F$_5$); 1,1,1,2,2,3,4-heptafluoro-3-hexene (CF$_3$CF$_2$CF=CFC$_2$H$_5$); 4,5,5,5-tetrafluoro-4-(trifluoromethyl)-1-pentene (CH$_2$=CHCH$_2$CF(CF$_3$)$_2$); 1,1,1,2,5,5,5-heptafluoro-4-methyl-2-pentene (CF$_3$CF=CHCH(CF$_3$)(CH$_3$)); 1,1,1,3-tetrafluoro-2-(trifluoromethyl)-2-pentene ((CF$_3$)$_2$C=CFC$_2$H$_5$); 1,1,1,2,3,4,4,5,5,6,6,7,7,7-tetradecafluoro-2-heptene (CF$_3$CF=CFCF$_2$CF$_2$C$_2$F$_5$); 1,1,1,2,2,3,4,5,5,6,6,7,7,7-tetradecafluoro-3-heptene (CF$_3$CF$_2$CF=CFCF$_2$C$_2$F$_5$); 1,1,1,3,4,4,5,5,6,6,7,7,7-tridecafluoro-2-heptene (CF$_3$CH=CFCF$_2$CF$_2$C$_2$F$_5$); 1,1,1,2,4,4,5,5,6,6,7,7,7-tridecafluoro-2-heptene (CF$_3$CF=CHCF$_2$CF$_2$C$_2$F$_5$); 1,1,1,2,2,4,5,5,6,6,7,7,7-tridecafluoro-3-heptene (CF$_3$CF$_2$CH=CFCF$_2$C$_2$F$_5$); 1,1,1,2,2,3,5,5,6,6,7,7,7-tridecafluoro-3-heptene (CF$_3$CF$_2$CF=CHCF$_2$C$_2$F$_5$); pentafluoroethyl trifluorovinyl ether (CF$_2$=CFOCF$_2$CF$_3$); and trifluoromethyl trifluorovinyl ether (CF$_2$=CFOCF$_3$); and b) at least one perfluoropolyether.

DETAILED DESCRIPTION OF THE INVENTION

The refrigerants or heat transfer fluids of the present invention are selected from the group consisting of saturated fluorocarbons, unsaturated fluorocarbons, chlorofluorocarbons, hydrochlorofluorocarbons, fluoroethers, hydrocarbons, carbon dioxide, dimethyl ether, ammonia, iodotrifluoromethane, and combinations thereof. Preferred refrigerants or heat transfer fluids include saturated and unsaturated fluorocarbons and hydrofluorocarbons.

In one embodiment, saturated fluorocarbon refrigerants or heat transfer fluids include tetrafluoromethane (PFC-14), hexafluoroethane (PFC-116), octafluoropropane (PFC-218), decafluorobutane (PFC-31-10), fluoromethane (HFC-41), difluoromethane (HFC-32), trifluoromethane (HFC-23), fluoroethane (HFC-161), 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134), 1,1,1,2,2-pentafluoroethane (HFC-125), 1,1,1,3,3,3-hexafluoropropane (HFC-236fa), 1,1,1,2,3,3,3-heptafluoropropane (HFC-227ea), 1,1,1,3,3-pentafluoropropane (HFC-245fa), R-404A (a blend of 44 wt. % of HFC-125, 52 wt. % of HFC-143a and 4 wt. % of HFC-134a), R-410A (a blend of 50 wt. % of HFC-32 and 50 wt. % of HFC-125), R-417A (a blend of 46.6 wt. % of HFC-125, 50 wt. % of HFC-134a and 3.4 wt. % of n-butane), R-422A (a blend of 85.1 wt. % of HFC-125, 11.5 wt. % of HFC-134a, and 3.4 wt. % of isobutane), R-407C (a blend of 23 wt. % of HFC-32, 25 wt. % of HFC-125 and 52 wt. % of HFC-134a), R-507A (a blend of 50% R-125 and 50% R-143a), and R-508A (a blend of 39% HFC-23 and 61% PFC-116)

In one embodiment, unsaturated fluorocarbon refrigerants and heat transfer fluids comprise compounds with 2 to 12 carbon atoms, in another embodiment the unsaturated fluorocarbons comprise compounds with 3 to 10 carbon atoms, and in yet another embodiment the unsaturated fluorocarbons comprise compounds with 3 to 7 carbon atoms. Representative unsaturated fluorocarbons include but are not limited to all compounds as listed in Table 1, Table 2, and Table 3.

The present invention provides unsaturated fluorocarbons having the formula E- or Z-$R^1CH=CHR^2$ (Formula I), wherein $R^1$ and $R^2$ are, independently, $C_1$ to $C_6$ perfluoroalkyl groups. Examples of $R^1$ and $R^2$ groups include, but are not limited to, $CF_3$, $C_2F_5$, $CF_2CF_2CF_3$, $CF(CF_3)_2$, $CF_2CF_2CF_2CF_3$, $CF(CF_3)CF_2CF_3$, $CF_2CF(CF_3)_2$, $C(CF_3)_3$, $CF_2CF_2CF_2CF_2CF_3$, $CF_2CF_2CF(CF_3)_2$, $C(CF_3)_2C_2F_5$, $CF_2CF_2CF_2CF_2CF_2CF_3$, $CF(CF_3)$ $CF_2CF_2C_2F_5$, and $C(CF_3)_2CF_2C_2F_5$. In one embodiment the unsaturated fluorocarbons of Formula I, have at least about 4 carbon atoms in the molecule. In another embodiment, the unsaturated fluorocarbons of Formula I have at least about 5 carbon atoms in the molecule. Exemplary, non-limiting Formula I compounds are presented in Table 1.

TABLE 1

| Code | Structure | Chemical Name |
|---|---|---|
| F11E | $CF_3CH=CHCF_3$ | 1,1,1,4,4,4-hexafluorobut-2-ene |
| F12E | $CF_3CH=CHC_2F_5$ | 1,1,1,4,4,5,5,5-octafluoropent-2-ene |
| F13E | $CF_3CH=CHCF_2C_2F_5$ | 1,1,1,4,4,5,5,6,6,6-decafluorohex-2-ene |
| F13iE | $CF_3CH=CHCF(CF_3)_2$ | 1,1,1,4,5,5,5-heptafluoro-4-(trifluoromethyl)pent-2-ene |
| F22E | $C_2F_5CH=CHC_2F_5$ | 1,1,1,2,2,5,5,6,6,6-decafluorohex-3-ene |
| F14E | $CF_3CH=CH(CF_2)_3CF_3$ | 1,1,1,4,4,5,5,6,6,7,7,7-dodecafluorohept-2-ene |
| F14iE | $CF_3CH=CHCF_2CF-(CF_3)_2$ | 1,1,1,4,4,5,6,6,6-nonafluoro-5-(trifluoromethyl)hex-2-ene |
| F14sE | $CF_3CH=CHCF(CF_3)-C_2F_5$ | 1,1,1,4,5,5,6,6,6-nonfluoro-4-(trifluoromethyl)hex-2-ene |
| F14tE | $CF_3CH=CHC(CF_3)_3$ | 1,1,1,5,5,5-hexafluoro-4,4-bis(trifluoromethyl)pent-2-ene |
| F23E | $C_2F_5CH=CHCF_2C_2F_5$ | 1,1,1,2,2,5,5,6,6,7,7,7-dodecafluorohept-3-ene |
| F23iE | $C_2F_5CH=CHCF(CF_3)_2$ | 1,1,1,2,2,5,6,6,6-nonafluoro-5-(trifluoromethyl)hex-3-ene |
| F15E | $CF_3CH=CH(CF_2)_4CF_3$ | 1,1,1,4,4,5,5,6,6,7,7,8,8,8-tetradecafluorooct-2-ene |
| F15iE | $CF_3CH=CH-CF_2CF_2CF(CF_3)_2$ | 1,1,1,4,4,5,5,6,7,7,7-undecafluoro-6-(trifluoromethyl)hept-2-ene |
| F15tE | $CF_3CH=CH-C(CF_3)_2C_2F_5$ | 1,1,1,5,5,6,6,6-octafluoro-4,4-bis(trifluoromethyl)hex-2-ene |
| F24E | $C_2F_5CH=CH(CF_2)_3CF_3$ | 1,1,1,2,2,5,5,6,6,7,7,8,8,8-tetradecafluorooct-3-ene |
| F24iE | $C_2F_5CH=CHCF_2CF-(CF_3)_2$ | 1,1,1,2,2,5,5,6,7,7,7-undecafluoro-6-(trifluoromethyl)hept-3-ene |
| F24sE | $C_2F_5CH=CHCF(CF_3)-C_2F_5$ | 1,1,1,2,2,5,6,6,7,7,7-undecafluoro-5-(trifluoromethyl)hept-3-ene |
| F24tE | $C_2F_5CH=CHC(CF_3)_3$ | 1,1,1,2,2,6,6,6-octafluoro-5,5-bis(trifluoromethyl)hex-3-ene |
| F33E | $C_2F_5CF_2CH=CH-CF_2C_2F_5$ | 1,1,1,2,2,3,3,6,6,7,7,8,8,8-tetradecafluorooct-4-ene |
| F3i3iE | $(CF_3)_2CFCH=CH-CF(CF_3)_2$ | 1,1,1,2,5,6,6,6-octafluoro-2,5-bis(trifluoromethyl)hex-3-ene |
| F33iE | $C_2F_5CF_2CH=CH-CF(CF_3)_2$ | 1,1,1,2,5,5,6,6,7,7,7-undecafluoro-2-(trifluoromethyl)hept-3-ene |
| F16E | $CF_3CH=CH(CF_2)_5CF_3$ | 1,1,1,4,4,5,5,6,6,7,7,8,8,,9,9,9-hexadecafluoronon-2-ene |
| F16sE | $CF_3CH=CHCF(CF_3)(CF_2)_2C_2F_5$ | 1,1,1,4,5,5,6,6,7,7,8,8,8-tridecafluoro-4-(trifluoromethyl)hept-2-ene |
| F16tE | $CF_3CH=CHC(CF_3)_2CF_2C_2F_5$ | 1,1,1,6,6,6-octafluoro-4,4-bis(trifluoromethyl)hept-2-ene |
| F25E | $C_2F_5CH=CH(CF_2)_4CF_3$ | 1,1,1,2,2,5,5,6,6,7,7,8,8,9,9,9-hexadecafluoronon-3-ene |
| F25iE | $C_2F_5CH=CH-CF_2CF_2CF(CF_3)_2$ | 1,1,1,2,2,5,5,6,6,7,8,8,8-tridecafluoro-7-(trifluoromethyl)oct-3-ene |

TABLE 1-continued

| Code | Structure | Chemical Name |
|---|---|---|
| F25tE | $C_2F_5CH=CH-C(CF_3)_2C_2F_5$ | 1,1,1,2,2,6,6,7,7,7-decafluoro-5,5-bis(trifluoromethyl)hept-3-ene |
| F34E | $C_2F_5CF_2CH=CH-(CF_2)_3CF_3$ | 1,1,1,2,2,3,3,6,6,7,7,8,8,9,9,9-hexadecafluoronon-4-ene |
| F34iE | $C_2F_5CF_2CH=CH-CF_2CF(CF_3)_2$ | 1,1,1,2,2,3,3,6,6,7,8,8,8-tridecafluoro-7-(trifluoromethyl)oct-4-ene |
| F34sE | $C_2F_5CF_2CH=CH-CF(CF_3)C_2F_5$ | 1,1,1,2,2,3,3,6,7,7,8,8,8-tridecafluoro-6-(trifluoromethyl)oct-4-ene |
| F34tE | $C_2F_5CF_2CH=CH-C(CF_3)_3$ | 1,1,1,5,5,6,6,7,7,7-decafluoro-2,2-bis(trifluoromethyl)hept-3-ene |
| F3i4E | $(CF_3)_2CFCH=CH-(CF_2)_3CF_3$ | 1,1,1,2,5,5,6,6,7,7,8,8,8-tridecafluoro-2(trifluoromethyl)oct-3-ene |
| F3i4iE | $(CF_3)_2CFCH=CH-CF_2CF(CF_3)_2$ | 1,1,1,2,5,5,6,7,7,7-decafluoro-2,6-bis(trifluoromethyl)hept-3-ene |
| F3i4sE | $(CF_3)_2CFCH=CH-CF(CF_3)C_2F_5$ | 1,1,1,2,5,6,6,7,7,7-decafluoro-2,5-bis(trifluoromethyl)hept-3-ene |
| F3i4tE | $(CF_3)_2CFCH=CH-C(CF_3)_3$ | 1,1,1,2,6,6,6-heptafluoro-2,5,5-tris(trifluoromethyl)hex-3-ene |
| F26E | $C_2F_5CH=CH(CF_2)_5CF_3$ | 1,1,1,2,2,5,5,6,6,7,7,8,8,9,9,10,10,10-octadecafluorodec-3-ene |
| F26sE | $C_2F_5CH=CHCF(CF_3)(CF_2)_2C_2F_5$ | 1,1,1,2,2,5,6,6,7,7,8,8,9,9,9-pentadecafluoro-5-(trifluoromethyl)non-3-ene |
| F26tE | $C_2F_5CH=CHC(CF_3)_2CF_2C_2F_5$ | 1,1,1,2,2,6,6,7,7,8,8,8-dodecafluoro-5,5-bis(trifluoromethyl)oct-3-ene |
| F35E | $C_2F_5CF_2CH=CH-(CF_2)_4CF_3$ | 1,1,1,2,2,3,3,6,6,7,7,8,8,9,9,10,10,10-octadecafluorodec-4-ene |
| F35iE | $C_2F_5CF_2CH=CH-CF_2CF_2CF(CF_3)_2$ | 1,1,1,2,2,3,3,6,6,7,7,8,8,9,9,9-pentadecafluoro-8-(trifluoromethyl)non-4-ene |
| F35tE | $C_2F_5CF_2CH=CH-C(CF_3)_2C_2F_5$ | 1,1,1,2,2,3,3,7,7,8,8,8-dodecafluoro-6,6-bis(trifluoromethyl)oct-4-ene |
| F3i5E | $(CF_3)_2CFCH=CH-(CF_2)_4CF_3$ | 1,1,1,2,5,5,6,6,7,7,8,8,9,9,9-pentadecafluoro-2-(trifluoromethyl)non-3-ene |
| F3i5iE | $(CF_3)_2CFCH=CH-CF_2CF_2CF(CF_3)_2$ | 1,1,1,2,5,5,6,6,8,8,8-dodecafluoro-2,7-bis(trifluoromethyl)oct-3-ene |
| F3i5tE | $(CF_3)_2CFCH=CH-C(CF_3)_2C_2F_5$ | 1,1,1,2,6,6,7,7,7-nonafluoro-2,5,5-tris(trifluoromethyl)hept-3-ene |
| F44E | $CF_3(CF_2)_3CH=CH-(CF_2)_3CF_3$ | 1,1,1,2,2,3,3,4,4,7,7,8,8,9,9,10,10,10-octadecafluorodec-5-ene |
| F44iE | $CF_3(CF_2)_3CH=CH-CF_2CF(CF_3)_2$ | 1,1,1,2,3,3,6,6,7,7,8,8,9,9,9-pentadecafluoro-2-(trifluoromethyl)non-4-ene |
| F44sE | $CF_3(CF_2)_3CH=CH-CF(CF_3)C_2F_5$ | 1,1,1,2,2,3,6,6,7,7,8,8,9,9,9-pentadecafluoro-3-(trifluoromethyl)non-4-ene |
| F44tE | $CF_3(CF_2)_3CH=CH-C(CF_3)_3$ | 1,1,1,5,5,6,6,7,7,8,8,8-dodecafluoro-2,2,-bis(trifluoromethyl)oct-3-ene |
| F4i4iE | $(CF_3)_2CFCF_2CH=CH-CF_2CF(CF_3)_2$ | 1,1,1,2,3,3,6,6,7,8,8,8-dodecafluoro-2,7-bis(trifluoromethyl)oct-4-ene |
| F4i4sE | $(CF_3)_2CFCF_2CH=CH-CF(CF_3)C_2F_5$ | 1,1,1,2,3,3,6,7,7,8,8,8-dodecafluoro-2,6-bis(trifluoromethyl)oct-4-ene |
| F4i4tE | $(CF_3)_2CFCF_2CH=CH-C(CF_3)_3$ | 1,1,1,5,5,6,7,7,7-nonafluoro-2,2,6-tris(trifluoromethyl)hept-3-ene |
| F4s4sE | $C_2F_5CF(CF_3)CH=CH-CF(CF_3)C_2F_5$ | 1,1,1,2,2,3,6,7,7,8,8,8-dodecafluoro-3,6-bis(trifluoromethyl)oct-4-ene |
| F4s4tE | $C_2F_5CF(CF_3)CH=CH-C(CF_3)_3$ | 1,1,1,5,6,6,7,7,7-nonafluoro-2,2,5-tris(trifluoromethyl)hept-3-ene |
| F4t4tE | $(CF_3)_3CCH=CH-C(CF_3)_3$ | 1,1,1,6,6,6-hexafluoro-2,2,5,5-tetrakis(trifluoromethyl)hex-3-ene |

Compounds of Formula I may be prepared by contacting a perfluoroalkyl iodide of the formula $R^1I$ with a perfluoroalkyltrihydroolefin of the formula $R^2CH=CH_2$ to form a trihydroiodoperfluoroalkane of the formula $R^1CH_2CHIR^2$. This trihydroiodoperfluoroalkane can then be dehydroiodinated to form $R^1CH=CHR^2$. Alternatively, the olefin $R^1CH=CHR^2$ may be prepared by dehydroiodination of a trihydroiodoperfluoroalkane of the formula $R^1CHICH_2R^2$ formed in turn by reacting a perfluoroalkyl iodide of the formula $R^2I$ with a perfluoroalkyltrihydroolefin of the formula $R^1CH=CH_2$.

Said contacting of a perfluoroalkyl iodide with a perfluoroalkyltrihydroolefin may take place in batch mode by combining the reactants in a suitable reaction vessel capable of operating under the autogenous pressure of the reactants and products at reaction temperature. Suitable reaction vessels include fabricated from stainless steels, in particular of the austenitic type, and the well-known high nickel alloys such as Monel® nickel-copper alloys, Hastelloy® nickel based alloys and Inconel® nickel-chromium alloys.

Alternatively, the reaction may take be conducted in semi-batch mode in which the perfluoroalkyltrihydroolefin reactant is added to the perfluoroalkyl iodide reactant by means of a suitable addition apparatus such as a pump at the reaction temperature.

The ratio of perfluoroalkyl iodide to perfluoroalkyltrihydroolefin should be between about 1:1 to about 4:1, preferably from about 1.5:1 to 2.5:1. Ratios less than 1.5:1 tend to result in large amounts of the 2:1 adduct as reported by Jeanneaux, et. al. in *Journal of Fluorine Chemistry*, Vol. 4, pages 261-270 (1974).

Preferred temperatures for contacting of said perfluoroalkyl iodide with said perfluoroalkyltrihydroolefin are preferably within the range of about 150° C. to 300° C., preferably from about 170° C. to about 250° C., and most preferably from about 180° C. to about 230° C.

Suitable contact times for the reaction of the perfluoroalkyl iodide with the perfluoroalkyltrihydroolefin are from about 0.5 hour to 18 hours, preferably from about 4 to about 12 hours.

The trihydroiodoperfluoroalkane prepared by reaction of the perfluoroalkyl iodide with the perfluoroalkyltrihydroolefin may be used directly in the dehydroiodination step or may preferably be recovered and purified by distillation prior to the dehydroiodination step.

The dehydroiodination step is carried out by contacting the trihydroiodoperfluoroalkane with a basic substance. Suitable basic substances include alkali metal hydroxides (e.g., sodium hydroxide or potassium hydroxide), alkali metal oxide (for example, sodium oxide), alkaline earth metal hydroxides (e.g., calcium hydroxide), alkaline earth metal oxides (e.g., calcium oxide), alkali metal alkoxides (e.g., sodium methoxide or sodium ethoxide), aqueous ammonia, sodium amide, or mixtures of basic substances such as soda lime. Preferred basic substances are sodium hydroxide and potassium hydroxide.

Said contacting of the trihydroiodoperfluoroalkane with a basic substance may take place in the liquid phase preferably in the presence of a solvent capable of dissolving at least a portion of both reactants. Solvents suitable for the dehydroiodination step include one or more polar organic solvents such as alcohols (e.g., methanol, ethanol, n-propanol, isopropanol, n-butanol, isobutanol, and tertiary butanol), nitriles (e.g., acetonitrile, propionitrile, butyronitrile, benzonitrile, or adiponitrile), dimethyl sulfoxide, N,N-dimethylformamide, N,N-dimethylacetamide, or sulfolane. The choice of solvent may depend on the boiling point product and the ease of separation of traces of the solvent from the product during purification. Typically, ethanol or isopropanol are good solvents for the reaction.

Typically, the dehydroiodination reaction may be carried out by addition of one of the reactants (either the basic substance or the trihydroiodoperfluoroalkane) to the other reactant in a suitable reaction vessel. Said reaction may be fabricated from glass, ceramic, or metal and is preferably agitated with an impeller or stirring mechanism.

Temperatures suitable for the dehydroiodination reaction are from about 10° C. to about 100° C., preferably from about 20° C. to about 70° C. The dehydroiodination reaction may be carried out at ambient pressure or at reduced or elevated pressure. Of note are dehydroiodination reactions in which the compound of Formula I is distilled out of the reaction vessel as it is formed.

Alternatively, the dehydroiodination reaction may be conducted by contacting an aqueous solution of said basic substance with a solution of the trihydroiodoperfluoroalkane in one or more organic solvents of lower polarity such as an alkane (e.g., hexane, heptane, or octane), aromatic hydrocarbon (e.g., toluene), halogenated hydrocarbon (e.g., methylene chloride, chloroform, carbon tetrachloride, or perchloroethylene), or ether (e.g., diethyl ether, methyl tert-butyl ether, tetrahydrofuran, 2-methyl tetrahydrofuran, dioxane, dimethoxyethane, diglyme, or tetraglyme) in the presence of a phase transfer catalyst. Suitable phase transfer catalysts include quaternary ammonium halides (e.g., tetrabutylammonium bromide, tetrabutylammonium hydrosulfate, triethylbenzylammonium chloride, dodecyltrimethylammonium chloride, and tricaprylylmethylammonium chloride), quaternary phosphonium halides (e.g., triphenylmethylphosphonium bromide and tetraphenylphosphonium chloride), or cyclic polyether compounds known in the art as crown ethers (e.g., 18-crown-6 and 15-crown-5).

Alternatively, the dehydroiodination reaction may be conducted in the absence of solvent by adding the trihydroiodoperfluoroalkane to a solid or liquid basic substance.

Suitable reaction times for the dehydroiodination reactions are from about 15 minutes to about six hours or more depending on the solubility of the reactants. Typically the dehydroiodination reaction is rapid and requires about 30 minutes to about three hours for completion. The compound of formula I may be recovered from the dehydroiodination reaction mixture by phase separation after addition of water, by distillation, or by a combination thereof.

In another embodiment of the present invention, unsaturated fluorocarbons comprise cyclic unsaturated fluorocarbons (cyclo-$[CX=CY(CZW)_n\text{-}]$ (Formula II), wherein X, Y, Z, and W are independently selected from H and F, and n is an integer from 2 to 5). In one embodiment the unsaturated fluorocarbons of Formula II, have at least about 3 carbon atoms in the molecule. In another embodiment, the unsaturated fluorocarbons of Formula II have at least about 4 carbon atoms in the molecule. In yet another embodiment, the unsaturated fluorocarbons of Formula II have at least about 5 carbon atoms in the molecule. Representative cyclic unsaturated fluorocarbons of Formula II are listed in Table 2.

TABLE 2

| Cyclic unsaturated fluorocarbons | Structure | Chemical name |
|---|---|---|
| FC-C1316cc | cyclo-$CF_2CF_2CF=CF-$ | 1,2,3,3,4,4-hexafluorocyclobutene |
| HFC-C1334cc | cyclo-$CF_2CF_2CH=CH-$ | 3,3,4,4-tetrafluorocyclobutene |
| HFC-C1436 | cyclo-$CF_2CF_2CF_2CH=CH-$ | 3,3,4,4,5,5,-hexafluorocyclopentene |
| FC-C1418y | cyclo-$CF_2CF=CFCF_2CF_2-$ | 1,2,3,3,4,4,5,5-octafluorocyclopentene |
| FC-C151-10y | cyclo-$CF_2CF=CFCF_2CF_2CF_2-$ | 1,2,3,3,4,4,5,5,6,6-decafluorocyclohexene |

The compositions of the present invention may comprise a single compound of Formula I or formula II, for example, one of the compounds in Table 1 or Table 2, or may comprise a combination of compounds of Formula I or formula II.

In another embodiment, unsaturated fluorocarbons may comprise those compounds listed in Table 3.

TABLE 3

| Name | Structure | Chemical name |
|---|---|---|
| HFC-1225ye | $CF_3CF=CHF$ | 1,2,3,3,3-pentafluoro-1-propene |
| HFC-1225zc | $CF_3CH=CF_2$ | 1,1,3,3,3-pentafluoro-1-propene |
| HFC-1225yc | $CHF_2CF=CF_2$ | 1,1,2,3,3-pentafluoro-1-propene |
| HFC-1234ye | $CHF_2CF=CHF$ | 1,2,3,3-tetrafluoro-1-propene |
| HFC-1234yf | $CF_3CF=CH_2$ | 2,3,3,3-tetrafluoro-1-propene |
| HFC-1234ze | $CF_3CH=CHF$ | 1,3,3,3-tetrafluoro-1-propene |
| HFC-1234yc | $CH_2FCF=CF_2$ | 1,1,2,3-tetrafluoro-1-propene |
| HFC-1234zc | $CHF_2CH=CF_2$ | 1,1,3,3-tetrafluoro-1-propene |
| HFC-1243yf | $CHF_2CF=CH_2$ | 2,3,3-trifluoro-1-propene |
| HFC-1243zf | $CF_3CH=CH_2$ | 3,3,3-trifluoro-1-propene |
| HFC-1243yc | $CH_3CF=CF_2$ | 1,1,2-trifluoro-1-propene |
| HFC-1243zc | $CH_2FCH=CF_2$ | 1,1,3-trifluoro-1-propene |
| HFC-1243ye | $CH_2FCF=CHF$ | 1,2,3-trifluoro-1-propene |
| HFC-1243ze | $CHF_2CH=CHF$ | 1,3,3-trifluoro-1-propene |
| FC-1318my | $CF_3CF=CFCF_3$ | 1,1,1,2,3,4,4,4-octafluoro-2-butene |
| FC-1318cy | $CF_3CF_2CF=CF_2$ | 1,1,2,3,3,4,4,4-octafluoro-1-butene |
| HFC-1327my | $CF_3CF=CHCF_3$ | 1,1,1,2,4,4,4-heptafluoro-2-butene |
| HFC-1327ye | $CHF=CFCF_2CF_3$ | 1,2,3,3,4,4,4-heptafluoro-1-butene |
| HFC-1327py | $CHF_2CF=CFCF_3$ | 1,1,1,2,3,4,4-heptafluoro-2-butene |
| | $(CF_3)_2C=CHF$ | 1,3,3,3-tetrafluoro-2-(trifluoromethyl)-1-propene |
| HFC-1327cz | $CF_2=CHCF_2CF_3$ | 1,1,3,3,4,4,4-heptafluoro-1-butene |
| HFC-1327cye | $CF_2=CFCHFCF_3$ | 1,1,2,3,4,4,4-heptafluoro-1-butene |
| HFC-1327cyc | $CF_2=CFCF_2CHF_2$ | 1,1,2,3,3,4,4-heptafluoro-1-butene |
| HFC-1336yf | $CF_3CF_2CF=CH_2$ | 2,3,3,4,4,4-hexafluoro-1-butene |
| HFC-1336ze | $CHF=CHCF_2CF_3$ | 1,3,3,4,4,4-hexafluoro-1-butene |
| HFC-1336eye | $CHF=CFCHFCF_3$ | 1,2,3,4,4,4-hexafluoro-1-butene |
| HFC-1336eyc | $CHF=CFCF_2CHF_2$ | 1,2,3,3,4,4-hexafluoro-1-butene |
| HFC-1336pyy | $CHF_2CF=CFCHF_2$ | 1,1,2,3,4,4-hexafluoro-2-butene |
| HFC-1336qy | $CH_2FCF=CFCF_3$ | 1,1,1,2,3,4-hexafluoro-2-butene |
| HFC-1336pz | $CHF_2CH=CFCF_3$ | 1,1,1,2,4,4-hexafluoro-2-butene |
| HFC-1336mzy | $CF_3CH=CFCHF_2$ | 1,1,1,3,4,4-hexafluoro-2-butene |
| HFC-1336qc | $CF_2=CFCF_2CH_2F$ | 1,1,2,3,3,4-hexafluoro-1-butene |
| HFC-1336pe | $CF_2=CFCHFCHF_2$ | 1,1,2,3,4,4-hexafluoro-1-butene |
| HFC-1336ft | $CH_2=C(CF_3)_2$ | 3,3,3-trifluoro-2-(trifluoromethyl)-1-propene |
| HFC-1345qz | $CH_2FCH=CFCF_3$ | 1,1,1,2,4-pentafluoro-2-butene |
| HFC-1345mzy | $CF_3CH=CFCH_2F$ | 1,1,1,3,4-pentafluoro-2-butene |
| HFC-1345fz | $CF_3CF_2CH=CH_2$ | 3,3,4,4,4-pentafluoro-1-butene |
| HFC-1345mzz | $CHF_2CH=CHCF_3$ | 1,1,1,4,4-pentafluoro-2-butene |
| HFC-1345sy | $CH_3CF=CFCF_3$ | 1,1,1,2,3-pentafluoro-2-butene |
| HFC-1345fyc | $CH_2=CFCF_2CHF_2$ | 2,3,3,4,4-pentafluoro-1-butene |
| HFC-1345pyz | $CHF_2CF=CHCHF_2$ | 1,1,2,4,4-pentafluoro-2-butene |
| HFC-1345cyc | $CH_3CF_2CF=CF_2$ | 1,1,2,3,3-pentafluoro-1-butene |
| HFC-1345pyy | $CH_2FCF=CFCHF_2$ | 1,1,2,3,4-pentafluoro-2-butene |
| HFC-1345eyc | $CH_2FCF_2CF=CF_2$ | 1,2,3,3,4-pentafluoro-1-butene |
| HFC-1345ctm | $CF_2=C(CF_3)(CH_3)$ | 1,1,3,3,3-pentafluoro-2-methyl-1-propene |
| HFC-1345ftp | $CH_2=C(CHF_2)(CF_3)$ | 2-(difluoromethyl)-3,3,3-trifluoro-1-propene |
| HFC1345fye | $CH_2=CFCHFCF_3$ | 2,3,4,4,4-pentafluoro-1-butene |
| HFC-1345eyf | $CHF=CFCH_2CF_3$ | 1,2,4,4,4-pentafluoro-1-butene |
| HFC-1345eze | $CHF=CHCHFCF_3$ | 1,3,4,4,4-pentafluoro-1-butene |
| HFC-1345ezc | $CHF=CHCF_2CHF_2$ | 1,3,3,4,4-pentafluoro-1-butene |
| HFC-1345eye | $CHF=CFCHFCHF_2$ | 1,2,3,4,4-pentafluoro-1-butene |
| HFC-1354fzc | $CH_2=CHCF_2CHF_2$ | 3,3,4,4-tetrafluoro-1-butene |
| HFC-1354ctp | $CF_2=C(CHF_2)(CH_3)$ | 1,1,3,3-tetrafluoro-2-methyl-1-propene |
| HFC-1354etm | $CHF=C(CF_3)(CH_3)$ | 1,3,3,3-tetrafluoro-2-methyl-1-propene |
| HFC-1354tfp | $CH_2=C(CHF_2)_2$ | 2-(difluoromethyl)-3,3-difluoro-1-propene |
| HFC-1354my | $CF_3CF=CHCH_3$ | 1,1,1,2-tetrafluoro-2-butene |
| HFC-1354mzy | $CH_3CF=CHCF_3$ | 1,1,1,3-tetrafluoro-2-butene |
| FC-141-10myy | $CF_3CF=CFCF_2CF_3$ | 1,1,1,2,3,4,5,5,5-decafluoro-2-pentene |
| FC-141-10cy | $CF_2=CFCF_2CF_2CF_3$ | 1,1,2,3,3,4,4,5,5,5-decafluoro-1-pentene |
| HFC-1429mzt | $(CF_3)_2C=CHCF_3$ | 1,1,1,4,4,4-hexafluoro-2-(trifluoromethyl)-2-butene |
| HFC-1429myz | $CF_3CF=CHCF_2CF_3$ | 1,1,1,2,4,4,5,5,5-nonafluoro-2-pentene |
| HFC-1429mzy | $CF_3CH=CFCF_2CF_3$ | 1,1,1,3,4,4,5,5,5-nonafluoro-2-pentene |
| HFC-1429eyc | $CHF=CFCF_2CF_2CF_3$ | 1,2,3,3,4,4,5,5,5-nonafluoro-1-pentene |
| HFC-1429czc | $CF_2=CHCF_2CF_2CF_3$ | 1,1,3,3,4,4,5,5,5-nonafluoro-1-pentene |
| HFC-1429cycc | $CF_2=CFCF_2CF_2CHF_2$ | 1,1,2,3,3,4,4,5,5-nonafluoro-1-pentene |
| HFC-1429pyy | $CHF_2CF=CFCF_2CF_3$ | 1,1,2,3,4,4,5,5,5-nonafluoro-2-pentene |
| HFC-1429myyc | $CF_3CF=CFCF_2CHF_2$ | 1,1,1,2,3,4,4,5,5-nonafluoro-2-pentene |
| HFC-1429myye | $CF_3CF=CFCHFCF_3$ | 1,1,1,2,3,4,5,5,5-nonafluoro-2-pentene |
| HFC-1429eyym | $CHF=CFCF(CF_3)_2$ | 1,2,3,4,4,4-hexafluoro-3-(trifluoromethyl)-1-butene |
| HFC-1429cyzm | $CF_2=CFCH(CF_3)_2$ | 1,1,2,4,4,4-hexafluoro-3-(trifluoromethyl)-1-butene |
| HFC-1429mzt | $CF_3CH=C(CF_3)_2$ | 1,1,1,4,4,4-hexafluoro-2-(trifluoromethyl)-2-butene |

TABLE 3-continued

| Name | Structure | Chemical name |
|---|---|---|
| HFC-1429czym | $CF_2=CHCF(CF_3)_2$ | 1,1,3,4,4,4-hexafluoro-3-(trifluoromethyl)-1-butene |
| HFC-1438fy | $CH_2=CFCF_2CF_2CF_3$ | 2,3,3,4,4,5,5,5-octafluoro-1-pentene |
| HFC-1438eycc | $CHF=CFCF_2CF_2CHF_2$ | 1,2,3,3,4,4,5,5-octafluoro-1-pentene |
| HFC-1438ftmc | $CH_2=C(CF_3)CF_2CF_3$ | 3,3,4,4,4-pentafluoro-2-(trifluoromethyl)-1-butene |
| HFC-1438czzm | $CF_2=CHCH(CF_3)_2$ | 1,1,4,4,4-pentafluoro-3-(trifluoromethyl)-1-butene |
| HFC-1438ezym | $CHF=CHCF(CF_3)_2$ | 1,3,4,4,4-pentafluoro-3-(trifluoromethyl)-1-butene |
| HFC-1438ctmf | $CF_2=C(CF_3)CH_2CF_3$ | 1,1,4,4,4-pentafluoro-2-(trifluoromethyl)-1-butene |
| HFC-1447fzy | $(CF_3)_2CFCH=CH_2$ | 3,4,4,4-tetrafluoro-3-(trifluoromethyl)-1-butene |
| HFC-1447fz | $CF_3CF_2CF_2CH=CH_2$ | 3,3,4,4,5,5,5-heptafluoro-1-pentene |
| HFC-1447fycc | $CH_2=CFCF_2CF_2CHF_2$ | 2,3,3,4,4,5,5-heptafluoro-1-pentene |
| HFC-1447czcf | $CF_2=CHCF_2CH_2CF_3$ | 1,1,3,3,5,5,5-heptafluoro-1-pentene |
| HFC-1447mytm | $CF_3CF=C(CF_3)(CH_3)$ | 1,1,1,2,4,4,4-heptafluoro-3-methyl-2-butene |
| HFC-1447fyz | $CH_2=CFCH(CF_3)_2$ | 2,4,4,4-tetrafluoro-3-(trifluoromethyl)-1-butene |
| HFC-1447ezz | $CHF=CHCH(CF_3)_2$ | 1,4,4,4-tetrafluoro-3-(trifluoromethyl)-1-butene |
| HFC-1447qzt | $CH_2FCH=C(CF_3)_2$ | 1,4,4,4-tetrafluoro-2-(trifluoromethyl)-2-butene |
| HFC-1447syt | $CH_3CF=C(CF_3)_2$ | 2,4,4,4-tetrafluoro-2-(trifluoromethyl)-2-butene |
| HFC-1456szt | $(CF_3)_2C=CHCH_3$ | 3-(trifluoromethyl)-4,4,4-trifluoro-2-butene |
| HFC-1456szy | $CF_3CF_2CF=CHCH_3$ | 3,4,4,5,5,5-hexafluoro-2-pentene |
| HFC-1456mstz | $CF_3C(CH_3)=CHCF_3$ | 1,1,1,4,4,4-hexafluoro-2-methyl-2-butene |
| HFC-1456fzce | $CH_2=CHCF_2CHFCF_3$ | 3,3,4,5,5,5-hexafluoro-1-pentene |
| HFC-1456ftmf | $CH_2=C(CF_3)CH_2CF_3$ | 4,4,4-trifluoro-2-(trifluoromethyl)-1-butene |
| FC-151-12c | $CF_3(CF_2)_3CF=CF_2$ | 1,1,2,3,3,4,4,5,5,6,6,6-dodecafluoro-1-hexene (or perfluoro-1-hexene) |
| FC-151-12mcy | $CF_3CF_2CF=CFCF_2CF_3$ | 1,1,1,2,2,3,4,5,5,6,6,6-dodecafluoro-3-hexene (or perfluoro-3-hexene) |
| FC-151-12mmtt | $(CF_3)_2C=C(CF_3)_2$ | 1,1,1,4,4,4-hexafluoro-2,3-bis(trifluoromethyl)-2-butene |
| FC-151-12mmzz | $(CF_3)_2CFCF=CFCF_3$ | 1,1,1,2,3,4,5,5,5-nonafluoro-4-(trifluoromethyl)-2-pentene |
| HFC-152-11mmtz | $(CF_3)_2C=CHC_2F_5$ | 1,1,1,4,4,5,5,5-octafluoro-2-(trifluoromethyl)-2-pentene |
| HFC-152-11mmyyz | $(CF_3)_2CFCF=CHCF_3$ | 1,1,1,3,4,5,5,5-octafluoro-4-(trifluoromethyl)-2-pentene |
| PFBE (or HFC-1549fz) | $CF_3CF_2CF_2CF_2CH=CH_2$ | 3,3,4,4,5,5,6,6,6-nonafluoro-1-hexene (or perfluorobutylethylene) |
| HFC-1549fztmm | $CH_2=CHC(CF_3)_3$ | 4,4,4-trifluoro-3,3-bis(trifluoromethyl)-1-butene |
| HFC-1549mmtts | $(CF_3)_2C=C(CH_3)(CF_3)$ | 1,1,1,4,4,4-hexafluoro-3-methyl-2-(trifluoromethyl)-2-butene |
| HFC-1549fycz | $CH_2=CFCF_2CH(CF_3)_2$ | 2,3,3,5,5,5-hexafluoro-4-(trifluoromethyl)-1-pentene |
| HFC-1549myts | $CF_3CF=C(CH_3)CF_2CF_3$ | 1,1,1,2,4,4,5,5,5-nonafluoro-3-methyl-2-pentene |
| HFC-1549mzzz | $CF_3CH=CHCH(CF_3)_2$ | 1,1,1,5,5,5-hexafluoro-4-(trifluoromethyl)-2-pentene |
| HFC-1558szy | $CF_3CF_2CF_2CF=CHCH_3$ | 3,4,4,5,5,6,6,6-octafluoro-2-hexene |
| HFC-1558fzccc | $CH_2=CHCF_2CF_2CF_2CHF_2$ | 3,3,4,4,5,5,6,6-octafluoro-2-hexene |
| HFC-1558mmtzc | $(CF_3)_2C=CHCF_2CH_3$ | 1,1,1,4,4-pentafluoro-2-(trifluoromethyl)-2-pentene |
| HFC-1558ftmf | $CH_2=C(CF_3)CH_2C_2F_5$ | 4,4,5,5,5-pentafluoro-2-(trifluoromethyl)-1-pentene |
| HFC-1567fts | $CF_3CF_2CF_2C(CH_3)=CH_2$ | 3,3,4,4,5,5,5-heptafluoro-2-methyl-1-pentene |
| HFC-1567szz | $CF_3CF_2CF_2CH=CHCH_3$ | 4,4,5,5,6,6,6-heptafluoro-2-hexene |
| HFC-1567fzfc | $CH_2=CHCH_2CF_2C_2F_5$ | 4,4,5,5,6,6,6-heptafluoro-1-hexene |
| HFC-1567sfyy | $CF_3CF_2CF=CFC_2H_5$ | 1,1,1,2,2,3,4-heptafluoro-3-hexene |
| HFC-1567fzfy | $CH_2=CHCH_2CF(CF_3)_2$ | 4,5,5,5-tetrafluoro-4-(trifluoromethyl)-1-pentene |
| HFC-1567myzzm | $CF_3CF=CHCH(CF_3)(CH_3)$ | 1,1,1,2,5,5,5-heptafluoro-4-methyl-2-pentene |
| HFC-1567mmtyf | $(CF_3)_2C=CFC_2H_5$ | 1,1,1,3-tetrafluoro-2-(trifluoromethyl)-2-pentene |
| FC-161-14myy | $CF_3CF=CFCF_2CF_2C_2F_5$ | 1,1,1,2,3,4,4,5,5,6,6,7,7,7-tetradecafluoro-2-heptene |
| FC-161-14mcyy | $CF_3CF_2CF=CFCF_2C_2F_5$ | 1,1,1,2,2,3,4,5,5,6,6,7,7,7-tetradecafluoro-2-heptene |

TABLE 3-continued

| Name | Structure | Chemical name |
|---|---|---|
| HFC-162-13mzy | $CF_3CH=CFCF_2C_2F_5$ | 1,1,1,3,4,4,5,5,6,6,7,7,7-tridecafluoro-2-heptene |
| HFC162-13myz | $CF_3CF=CHCF_2C_2F_5$ | 1,1,1,2,4,4,5,5,6,6,7,7,7-tridecafluoro-2-heptene |
| HFC-162-13mczy | $CF_3CF_2CH=CFCF_2C_2F_5$ | 1,1,1,2,2,4,5,5,6,6,7,7,7-tridecafluoro-3-heptene |
| HFC-162-13mcyz | $CF_3CF_2CF=CHCF_2C_2F_5$ | 1,1,1,2,2,3,5,5,6,6,7,7,7-tridecafluoro-3-heptene |
| PEVE | $CF_2=CFOCF_2CF_3$ | pentafluoroethyl trifluorovinyl ether |
| PMVE | $CF_2=CFOCF_3$ | trifluoromethyl trifluorovinyl ether |

The compounds listed in Table 2 and Table 3 are available commercially or may be prepared by processes known in the art or as described herein.

1,1,1,4,4-pentafluoro-2-butene may be prepared from 1,1,1,2,4,4-hexafluorobutane ($CHF_2CH_2CHFCF_3$) by dehydrofluorination over solid KOH in the vapor phase at room temperature. The synthesis of 1,1,1,2,4,4-hexafluorobutane is described in U.S. Pat. No. 6,066,768, incorporated herein by reference.

1,1,1,4,4-hexafluoro-2-butene may be prepared from 1,1,1,4,4,4-hexafluoro-2-iodobutane ($CF_3CHICH_2CF_3$) by reaction with KOH using a phase transfer catalyst at about 60° C. The synthesis of 1,1,1,4,4,4-hexafluoro-2-iodobutane may be carried out by reaction of perfluoromethyl iodide ($CF_3I$) and 3,3,3-trifluoropropene ($CF_3CH=CH_2$) at about 200° C. under autogenous pressure for about 8 hours.

3,4,4,5,5,5-hexafluoro-2-pentene may be prepared by dehydrofluorination of 1,1,1,2,2,3,3-heptafluoropentane ($CF_3CF_2CF_2CH_2CH_3$) using solid KOH or over a carbon catalyst at 200-300° C. 1,1,1,2,2,3,3-heptafluoropentane may be prepared by hydrogenation of 3,3,4,4,5,5,5-heptafluoro-1-pentene ($CF_3CF_2CF_2CH=CH_2$).

1,1,1,2,3,4-hexafluoro-2-butene may be prepared by dehydrofluorination of 1,1,1,2,3,3,4-heptafluorobutane ($CH_2FCF_2CHFCF_3$) using solid KOH.

1,1,1,2,4,4-hexafluoro-2-butene may be prepared by dehydrofluorination of 1,1,1,2,2,4,4-heptafluorobutane ($CHF_2CH_2CF_2CF_3$) using solid KOH.

1,1,1,3,4,4-hexafluoro2-butene may be prepared by dehydrofluorination of 1,1,1,3,3,4,4-heptafluorobutane ($CF_3CH_2CF_2CHF_2$) using solid KOH.

1,1,1,2,4-pentafluoro-2-butene may be prepared by dehydrofluorination of 1,1,1,2,2,3-hexafluorobutane ($CH_2FCH_2CF_2CF_3$) using solid KOH.

1,1,1,3,4-pentafluoro-2-butene may be prepared by dehydrofluorination of 1,1,1,3,3,4-hexafluorobutane ($CF_3CH_2CF_2CH_2F$) using solid KOH.

1,1,1,3-tetrafluoro-2-butene may be prepared by reacting 1,1,1,3,3-pentafluorobutane ($CF_3CH_2CF_2CH_3$) with aqueous KOH at 120° C.

1,1,1,4,4,5,5,5-octafluoro-2-pentene may be prepared from ($CF_3CHICH_2CF_2CF_3$) by reaction with KOH using a phase transfer catalyst at about 60° C. The synthesis of 4-iodo-1,1,1,2,2,5,5,5-octafluoropentane may be carried out by reaction of perfluoroethyliodide ($CF_3CF_2I$) and 3,3,3-trifluoropropene at about 200° C. under autogenous pressure for about 8 hours.

1,1,1,2,2,5,5,6,6,6-decafluoro-3-hexene may be prepared from 1,1,1,2,2,5,5,6,6,6-decafluoro-3-iodohexane ($CF_3CF_2CHICH_2CF_2CF_3$) by reaction with KOH using a phase transfer catalyst at about 60° C. The synthesis of 1,1,1,2,2,5,5,6,6,6-decafluoro-3-iodohexane may be carried out by reaction of perfluoroethyliodide ($CF_3CF_2I$) and 3,3,4,4,4-pentafluoro-1-butene ($CF_3CF_2CH=CH_2$) at about 200° C. under autogenous pressure for about 8 hours.

1,1,1,4,5,5,5-heptafluoro-4-(trifluoromethyl)-2-pentene may be prepared by the dehydrofluorination of 1,1,1,2,5,5,5-heptafluoro-4-iodo-2-(trifluoromethyl)-pentane ($CF_3CHICH_2CF(CF_3)_2$) with KOH in isopropanol. $CF_3CHICH_2CF(CF_3)_2$ is made from reaction of $(CF_3)_2CFI$ with $CF_3CH=CH_2$ at high temperature, such as about 200° C.

1,1,1,4,4,5,5,6,6,6-decafluoro-2-hexene may be prepared by the reaction of 1,1,1,4,4,4-hexafluoro-2-butene ($CF_3CH=CHCF_3$) with tetrafluoroethylene ($CF_2=CF_2$) and antimony pentafluoride ($SbF_5$).

2,3,3,4,4-pentafluoro-1-butene may be prepared by dehydrofluorination of 1,1,2,2,3,3-hexafluorobutane over fluorided alumina at elevated temperature.

2,3,3,4,4,5,5,5-ocatafluoro-1-pentene may be prepared by dehydrofluorination of 2,2,3,3,4,4,5,5,5-nonafluoropentane over solid KOH.

1,2,3,3,4,4,5,5-octafluoro-1-pentene may be prepared by dehydrofluorination of 2,2,3,3,4,4,5,5,5-nonafluoropentane over fluorided alumina at elevated temperature.

Many of the compounds of Formula I, Formula II, Table 1, Table 2, and Table 3 exist as different configurational isomers or stereoisomers. When the specific isomer is not designated, the present invention is intended to include all single configurational isomers, single stereoisomers, or any combination thereof. For instance, F11E is meant to represent the E-isomer, Z-isomer, or any combination or mixture of both isomers in any ratio. As another example, HFC-1225ye is meant to represent the E-isomer, Z-isomer, or any combination or mixture of both isomers in any ratio.

Representative chlorofluorocarbon refrigerants or heat transfer fluids include trichlorofluoromethane (CFC-11), dichlorodifluoromethane (CFC-12), 1,1,1-trichlorotrifluoroethane (CFC-113a), 1,1,2-trichlorotrifluoroethane (CFC-113), and chloropentafluoroethane (CFC-115).

Representative hydrochlorofluorocarbon refrigerants or heat transfer fluids include chlorodifluoromethane (HCFC-22), 2-chloro-1,1,1-trifluoroethane (HCFC-123), 2-chloro-1,1,1,2-tetrafluoroethane (HCFC-124) and 1-chloro-1,1-difluoroethane (HCFC-142b).

Representative fluoroether refrigerants or heat transfer fluids include $CF_3OCHF_2$, $CF_3OCH_3$, $CF_3OCH_2F$, $CHF_2OCHF_2$, cyclo-($CF_2CF_2CF_2O-$), $CF_3CF_2OCH_3$, $CHF_2OCHFCF_3$, $CHF_2CF_2OCH_3$, $C_4F_9OCH_3$, $C_4F_9OC_2H_5$, $CF_3OCF_3$, $CF_3OC_2F_5$, $C_2F_5OC_2F_5$ and $CF_3OCF(CF_3)CF(CF_3)OCF_3$.

Representative hydrocarbon refrigerants or heat transfer fluids include methane, ethane, propane, cyclopropane, propylene, n-butane, cyclobutane, 2-methylpropane, methylcyclopropane, n-pentane, cyclopentane, 2-methylbutane, methylcyclobutane, 2,2-dimethylpropane and dimethylcyclopropane isomers.

In one embodiment, refrigerants or heat transfer fluids may comprise single compounds. In another embodiment refrigerants or heat transfer fluids may be mixtures of two or more compounds.

In some embodiments, refrigerant or heat transfer fluids may comprise at least one compound from the group consisting of HFC-1225ye, HFC-1234yf, HFC-1234ze, HFC-1243zf, and mixtures thereof.

In some embodiments, of particular interest are refrigerant and heat transfer fluids comprising at least two compounds selected from the group consisting of HFC-1225ye, HFC-1234yf, HFC-32, HFC-125, HFC-134a, and $CF_3I$.

In another embodiment, refrigerants or heat transfer fluids may comprise:
- 1,2,3,3,3-pentafluoro-1-propene and difluoromethane;
- 1,2,3,3,3-pentafluoro-1-propene, difluoromethane, and pentafluoroethane;
- 2,3,3,3-tetrafluoro-1-propene and iodotrifluoromethane;
- 1,2,3,3,3-pentafluoro-1-propene, difluoromethane, and 1,1,1,2-tetrafluoroethane;
- 1,2,3,3,3-pentafluoro-1-propene and 2,3,3,3-tetrafluoro-1-propene;
- 1,2,3,3,3-pentafluoro-1-propene, 2,3,3,3-tetrafluoro-1-propene, and difluoromethane;
- 1,2,3,3,3-pentafluoro-1-propene, 2,3,3,3-tetrafluoro-1-propene, and pentafluoroethane;
- 1,2,3,3,3-pentafluoro-1-propene, 2,3,3,3-tetrafluoro-1-propene, and 1,1,1,2-tetrafluoroethane;
- 1,2,3,3,3-pentafluoro-1-propene, 2,3,3,3-tetrafluoro-1-propene, and iodotrifluoromethane;
- 1,2,3,3,3-pentafluoro-1-propene, 2,3,3,3-tetrafluoro-1-propene, difluoromethane, and iodotrifluoromethane;
- 1,2,3,3,3-pentafluoro-1-propene, 2,3,3,3-tetrafluoro-1-propene, and 1,1,1,2-tetrafluoroethane;
- 2,3,3,3-tetrafluoro-1-propene and 1,1,1,2-tetrafluoroethane; or 2,3,3,3-tetrafluoro-1-propene and pentafluoroethane.

In another embodiment, refrigerants or heat transfer fluids may comprise:
- about 1 weight percent to about 99 weight percent 1,2,3,3,3-pentafluoro-1-propene and about 99 weight percent to about 1 weight percent difluoromethane, or about 63 weight percent to about 99 weight percent 1,2,3,3,3-pentafluoro-1-propene and about 37 weight percent to about 1 weight percent difluoromethane;
- about 0.1 weight percent to about 98 weight percent 1,2,3,3,3-pentafluoro-1-propene, about 0.1 weight percent to about 98 weight percent difluoromethane, and about 0.1 weight percent to about 98 weight percent pentafluoroethane, or about 5 weight percent to about 90 weight percent 1,2,3,3,3-pentafluoro-1-propene, about 5 weight percent to about 90 weight percent difluoromethane, and about 5 weight percent to about 90 weight percent pentafluoroethane;
- about 1 weight percent to about 99 weight percent 2,3,3,3-tetrafluoro-1-propene and about 99 weight percent to about 1 weight percent iodotrifluoromethane, or about 25 weight percent to about 99 weight percent 2,3,3,3-tetrafluoro-1-propene and about 75 weight percent to about 1 weight percent iodotrifluoromethane;
- about 1 weight percent to about 98 weight percent 1,2,3,3,3-pentafluoro-1-propene, about 1 weight percent to about 98 weight percent difluoromethane, and about 1 weight percent to about 98 weight percent 1,1,1,2-tetrafluoroethane or about 1 weight percent to about 80 weight percent 1,2,3,3,3-pentafluoro-1-propene, about 1 weight percent to about 80 weight percent difluoromethane, and about 1 weight percent to about 80 weight percent 1,1,1,2-tetrafluoroethane;
- about 1 weight percent to about 99 weight percent 1,2,3,3,3-pentafluoro-1-propene and about 99 weight percent to about 1 weight percent 2,3,3,3-tetrafluoro-1-propene, or about 52 weight percent to about 99 weight percent 1,2,3,3,3-pentafluoro-1-propene and about 48 weight percent to about 1 weight percent 2,3,3,3-tetrafluoro-1-propene;
- about 1 weight percent to about 98 weight percent 1,2,3,3,3-pentafluoro-1-propene, about 1 weight percent to about 98 weight percent 2,3,3,3-tetrafluoro-1-propene, and about 0.1 weight percent to about 98 weight percent difluoromethane, or about 10 weight percent to about 90 weight percent 1,2,3,3,3-pentafluoro-1-propene, about 5 weight percent to about 90 weight percent 2,3,3,3-tetrafluoro-1-propene, and about 0.1 weight percent to about 50 weight percent difluoromethane;
- about 1 weight percent to about 98 weight percent 1,2,3,3,3-pentafluoro-1-propene, about 1 weight percent to about 98 weight percent 2,3,3,3-tetrafluoro-1-propene, and about 0.1 weight percent to about 98 weight percent pentafluoroethane, or about 10 weight percent to about 90 weight percent 1,2,3,3,3-pentafluoro-1-propene, about 5 weight percent to about 90 weight percent 2,3,3,3-tetrafluoro-1-propene, and about 0.1 weight percent to about 50 weight percent pentafluoroethane;
- about 1 weight percent to about 98 weight percent 1,2,3,3,3-pentafluoro-1-propene, about 1 weight percent to about 98 weight percent 2,3,3,3-tetrafluoro-1-propene, and about 0.1 weight percent to about 98 weight percent 1,1,1,2-tetrafluoroethane, or about 10 weight percent to about 90 weight percent 1,2,3,3,3-pentafluoro-1-propene, about 10 weight percent to about 90 weight percent 2,3,3,3-tetrafluoro-1-propene, and about 0.1 weight percent to about 50 weight percent 1,1,1,2-tetrafluoroethane;
- about 1 weight percent to about 98 weight percent 1,2,3,3,3-pentafluoro-1-propene, about 1 weight percent to about 98 weight percent 2,3,3,3-tetrafluoro-1-propene, and about 1 weight percent to about 98 weight percent iodotrifluoromethane, or about 9 weight percent to about 90 weight percent 1,2,3,3,3-pentafluoro-1-propene, about 9 weight percent to about 90 weight percent 2,3,3,3-tetrafluoro-1-propene, and about 1 weight percent to about 60 weight percent iodotrifluoromethane;
- about 1 weight percent to about 97 weight percent 1,2,3,3,3-pentafluoro-1-propene, about 1 weight percent to about 97 weight percent 2,3,3,3-tetrafluoro-1-propene, about 0.1 weight percent to about 97 weight percent difluoromethane, and about 1 weight percent to about 97 weight percent iodotrifluoromethane, or about 10 weight percent to about 80 weight percent 1,2,3,3,3-pentafluoro-1-propene, about 10 weight percent to about 80 weight percent 2,3,3,3-tetrafluoro-1-propene, about 1 weight percent to about 60 weight percent difluoromethane, and about 1 weight percent to about 60 weight percent iodotrifluoromethane;
- about 1 weight percent to about 99 weight percent 2,3,3,3-tetrafluoro-1-propene and about 99 weight percent to about 1 weight percent 1,1,1,2-tetrafluoroethane, or about 30 weight percent to about 99 weight percent 2,3,3,3-tetrafluoro-1-propene and about 70 weight percent to about 1 weight percent 1,1,1,2-tetrafluoroethane; or about 0.1 weight percent to about 99.9 weight percent 2,3,3,3-tetrafluoro-1-propene and about 99.9 weight percent to about 0.1 weight percent pentafluoroethane.

The present invention provides perfluoropolyethers as additives which are miscible with chlorofluorocarbon and hydrofluorocarbon refrigerants or heat transfer fluids. A common characteristic of perfluoropolyethers is the presence of perfluoroalkyl ether moieties. Perfluoropolyether is synonymous to perfluoropolyalkylether. Other synonymous terms frequently used include "PFPE", "PFAE", "PFPE oil", "PFPE fluid", and "PFPAE". For example, Krytox®, available from DuPont, is a perfluoropolyether having the formula of $CF_3—(CF_2)_2—O—[CF(CF_3)—CF_2—O]j'$-R'f. In the formula, j' is 2-100, inclusive and R'f is $CF_2CF_3$, a C3 to C6 perfluoroalkyl group, or combinations thereof.

Other PFPEs including the Fomblin® and Galden® fluids, available from Ausimont, Milan, Italy and produced by perfluoroolefin photo oxidation, can also be used. Fomblin®-Y can have the formula of $CF_3O(CF_2CF(CF_3)—O—)_m'(CF_2—O—)_n—R_{1f}$. Also suitable is $CF_3O[CF_2CF(CF_3)O]_{m'}$, $(CF_2CF_2O)_o$, $(CF_2O)_n—R_{1f}$. In the formulae $R_{1f}$ is $CF_3$, $C_2F_5$, $C_3F_7$, or combinations of two or more thereof; (m'+n') is 8-45, inclusive; and m/n is 20-1000, inclusive; o' is 1; (m'+n'+o') is 8-45, inclusive; m'/n' is 20-1000, inclusive.

Fomblin®-Z can have the formula of $CF_3O(CF_2CF_2—O)_p$, $(CF_2—O)_q$, $CF_3$ where (p'+q') is 40-180 and p'/q' is 0.5-2, inclusive.

Demnum™ fluids, another family of PFPE available from Daikin Industries, Japan, can also be used. It can be produced by sequential oligomerization and fluorination of 2,2,3,3-tetrafluorooxetane, yielding the formula of $F—[(CF_2)_3—O]_{t'}—R_{2f}$ where $R_{2f}$ is $CF_3$, $C_2F_5$, or combinations thereof and t' is 2-200, inclusive.

The two end groups of the perfluoropolyether, independently, can be functionalized or unfunctionalized. In an unfunctionalized perfluoropolyether, the end group can be branched or straight chain perfluoroalkyl radical end groups. Examples of such perfluoropolyethers can have the formula of $C_{r'}F_{(2r'+1)}$-A-$C_{r'}F_{(2r'+1)}$ in which each r' is independently 3 to 6; A can be $O—(CF(CF_3)CF_2—O)_{w'}$, $O(CF_2—O)_{x'}$, $(CF_2CF_2—O)_{y'}$, $O—(C_2F_4—O)_{w'}$, $O—(C_2F_4—O)_x(C_3F_6—O)_{y'}$, $O—(CF(CF_3)CF_2—O)_x(CF_2O)_{y'}$, $O—(CF_2CF_2CF_2—O)_{w'}$, $O—(CF(CF_3)CF_2—O)_x(CF_2CF_2—O)_{y'}$-$(CF_2—O)_{z'}$, or combinations of two or more thereof; preferably A is $O—(CF(CF_3)CF_2—O)_{w'}$, $O—(C_2F_4—O)_{w'}$, $O—(C_2F_4—O)_{x'}$, $(C_3F_6—O)_{y'}$, $O—(CF_2CF_2CF_2—O)_{w'}$, or combinations of two or more thereof; w' is 4 to 100; x' and y' are each independently 1 to 100. Specific examples include, but are not limited to, $F(CF(CF_3)—CF_2—O)_9—CF_2CF_3$, $F(CF(CF_3)—CF_2—O)_9—CF(CF_3)_2$, and combinations thereof. In such PFPEs, up to 30% of the halogen atoms can be halogens other than fluorine, such as, for example, chlorine atoms.

The two end groups of the perfluoropolyether, independently, can also be functionalized. A typical functionalized end group can be selected from the group consisting of esters, hydroxyls, amines, amides, cyanos, carboxylic acids and sulfonic acids Representative ester end groups include —$COOCH_3$, —$COOCH_2CH_3$, —$CF_2COOCH_3$, —$CF_2COOCH_2CH_3$, —$CF_2CF_2COOCH_3$, —$CF_2CF_2COOCH_2CH_3$, —$CF_2CH_2COOCH_3$, —$CF_2CF_2CH_2COOCH_3$, —$CF_2CH_2CH_2COOCH_3$, —$CF_2CF_2CH_2CH_2COOCH_3$.

Representative hydroxyl end groups include —$CF_2OH$, —$CF_2CF_2OH$, —$CF_2CH_2OH$, —$CF_2CF_2CH_2OH$, —$CF_2CH_2CH_2OH$, —$CF_2CF_2CH_2CH_2OH$.

Representative amine end groups include —$CF_2NR^1R^2$, —$CF_2CF_2NR^1R^2$, —$CF_2CH_2NR^1R^2$, —$CF_2CF_2CH_2NR^1R^2$, —$CF_2CH_2CH_2NR^1R^2$, —$CF_2CF_2CH_2CH_2NR^1R^2$, wherein $R^1$ and $R^2$ are independently H, $CH_3$, or $CH_2CH_3$.

Representative amide end groups include —$CF_2C(O)NR^1R^2$, —$CF_2CF_2C(O)NR^1R^2$, —$CF_2CH_2C(O)NR^1R^2$, —$CF_2CF_2CH_2C(O)NR^1R^2$, —$CF_2CH_2CH_2C(O)NR^1R^2$, —$CF_2CF_2CH_2CH_2C(O)NR^1R^2$, wherein $R^1$ and $R^2$ are independently H, $CH_3$, or $CH_2CH_3$.

Representative cyano end groups include —$CF_2CN$, —$CF_2CF_2CN$, —$CF_2CH_2CN$, —$CF_2CF_2CH_2CN$, —$CF_2CH_2CH_2CN$, —$CF_2CF_2CH_2CH_2CN$.

Representative carboxylic acid end groups include —$CF_2COOH$, —$CF_2CF_2COOH$, —$CF_2CH_2COOH$, —$CF_2CF_2CH_2COOH$, —$CF_2CH_2CH_2COOH$, —$CF_2CF_2CH_2CH_2COOH$.

Representative sulfonic acid end groups include —$S(O)(O)OR^3$, —$S(O)(O)R^4$, —$CF_2OS(O)(O)OR^3$, —$CF_2CF_2OS(O)(O)OR^3$, —$CF_2CH_2OS(O)(O)OR^3$, —$CF_2CF_2CH_2OS(O)(O)OR^3$, —$CF_2CH_2CH_2OS(O)(O)OR^3$, —$CF_2CF_2CH_2CH_2OS(O)(O)OR^3$, —$CF_2S(O)(O)OR^3$, —$CF_2CF_2S(O)(O)OR^3$, —$CF_2CH_2S(O)(O)OR^3$, —$CF_2CF_2CH_2S(O)(O)OR^3$, —$CF_2CH_2CH_2S(O)(O)OR^3$, —$CF_2CF_2CH_2CH_2S(O)(O)OR^3$, —$CF_2OS(O)(O)R^4$, —$CF_2CF_2OS(O)(O)R^4$, —$CF_2CH_2OS(O)(O)R^4$, —$CF_2CF_2CH_2OS(O)(O)R^4$, —$CF_2CH_2CH_2OS(O)(O)R^4$, —$CF_2CF_2CH_2CH_2OS(O)(O)R^4$, wherein $R^3$ is H, $CH_3$, $CH_2CH_3$, $CH_2CF_3$, $CF_3$, or $CF_2CF_3$, $R^4$ is $CH_3$, $CH_2CH_3$, $CH_2CF_3$, $CF_3$, or $CF_2CF_3$.

The refrigerant-perfluoropolyether additive combination of this invention improves performance of refrigeration, air conditioning and heat transfer system in one or more aspects. In one aspect, it enables adequate oil return to the compressor such that oil levels are maintained at the proper operating level by preventing accumulation of oil in the heat exchanger coils. In another aspect, the refrigerant-perfluoropolyether may also improve lubrication performance of mineral oil and synthetic lubricant oils. In yet another aspect, the refrigerant-perfluoropolyether also improves heat transfer efficiency and thus the energy efficiency of a refrigeration, air conditioning or heat transfer system. The refrigerant-perfluoropolyether has also been shown to reduce friction and wear in boundary lubrication, which is expected to result in longer compressor life. The advantages listed above are not intended to be exhaustive.

Cooling capacity (also referred to as refrigeration capacity or capacity) is a measure of the change in enthalpy of a refrigerant in an evaporator per pound of refrigerant circulated, i.e., the heat removed by the refrigerant in the evaporator per a given time. Therefore, the capacity is a measure of the ability of a refrigerant or heat transfer composition to produce cooling. The higher the capacity the greater the cooling that may be produced.

Energy efficiency (EER) is a term describing the efficiency of a cooling or heating system based upon the energy consumed in use.

Reference to "an effective amount of perfluoropolyether" in this application means an amount of perfluoropolyether additive to provide sufficient oil return to the compressor in order to maintain or improve lubrication or energy efficiency performance or both, wherein said amount of perfluoropolyether is adjusted by one of ordinary skill to a level appropriate to the individual refrigeration, air conditioning or heat transfer system (coil, compressor, etc.) and refrigerant or heat transfer fluid employed.

In some embodiments of this invention, the amount of perfluoropolyether is less than 40% by weight relative to the refrigerant or heat transfer fluid. In one embodiment, the amount of perfluoropolyether additive is less than about 20-30 wt. % relative to the refrigerant or heat transfer fluid. In another embodiment, the perfluoropolyether additive is less than about 10 wt. % relative to the refrigerant or heat transfer fluid. In another embodiment, the perfluoropolyether additive is less than about 1 to about 2 wt. % relative to the refrigerant or heat transfer fluid. In another embodiment, the perfluoropolyether additive is between about 0.01 wt. % and 1.0 wt. % relative to the refrigerant or heat transfer fluid. In yet another embodiment, the perfluoropolyether additive is between about 0.03 and 0.80 wt. % relative to the refrigerant or heat transfer fluid.

The compositions of the present invention may further comprise about 0.01 weight percent to about 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, certain refrigeration or air-conditioning system additives may be added, as desired, to compositions of the present invention in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the inventive compositions in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g. zinc dialkyl dithiophosphate (or ZDDP), Lubrizol 1375 and other members of this family of chemicals may be used in compositions of the present invention. Other antiwear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodeceyl succinic acid (DDSA), amine phosphate (AP), oleoyl sarcosine, imidazone derivatives and substituted sulfphonates. Metal surface deactivators include areoxalyl bis(benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

Additional additives include stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; dithiophosphates, such as Irgalube® 63 (Ciba Specialty Chemicals, Basel, Switzerland); dialkylthiophosphate esters, such as Irgalube® 353 (Ciba) and Irgalube® 350 (Ciba); butylated triphenylphosphorothionates, such as Irgalube® 232 (Ciba); amine phosphates, such as Irgalube® 349 (Ciba); hindered phosphites, such as Irgafos 168 (Tris-(di-tert-butylphenyl) phosphite—Ciba), Irgafos OPH (Di-n-octyl phosphite—Ciba), and Irgafos DDPP (Iso-decyl diphenyl phosphite—Ciba); anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol(methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, such as Irganox® HP-136 (Ciba); benzyl phenyl sulfide; diphenyl sulfide; diisopropylamine; dioctadecyl 3,3'-thiodipropionate, such as Irganox® PS 802 (Ciba); didodecyl 3,3'-thiopropionate, such as Irganox® PS 800 (Ciba); di-(2, 2,6,6-tetramethyl-4-piperidyl)sebacate, such as Tinuvin® 770 (Ciba); poly-(N-hydroxyethyl-2,2,6,6-tetramethyl-4-hydroxy-piperidyl succinate, such as Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others as disclosed in International Patent Application No. PCT/US07/07477, filed Mar. 26, 2007.

Ionic liquid stabilizers comprise at least one ionic liquids. Ionic liquids are organic salts that are liquid at room temperature (approximately 25° C.). In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCCIFCF_2SO_3]-$, $[(CF_3SO_2)_2N]-$, $[(CF_3CF_2SO_2)_2N]-$, $[(CF_3SO_2)_3C]-$, $[CF_3CO_2]-$, and $F-$. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

Lubricants used in this invention include natural and synthetic lubricant oils. A preferred example of natural lubricant oil is mineral oil. Other, synthetic lubricant oils including alkylbenzene, polyol ester, polyalkylene glycols, polyvinyl ethers, carbonates and polyalphaolefin may also be used. In one aspect of the invention, perfluoropolyether is used together with mineral oil.

In another aspect of the invention, perfluoropolyether is used together with synthetic lubricant oils.

In some embodiments of this invention, the amount of perfluoropolyether is less than 50% by weight relative to the mineral oil. In one embodiment, the amount of perfluoropolyether is less than 20% by weight relative to the mineral oil. In another embodiment, the amount of perfluoropolyether is less than 5% by weight relative to the mineral oil. In yet another embodiment, the amount of perfluoropolyether is less than 3 wt. % relative to the mineral oil.

In one embodiment of this invention, the refrigeration or heat transfer fluid composition comprises a mineral oil, perfluoropolyether, and a refrigeration or heat transfer fluid selected from the group consisting of R-407C, R-422A, R-417A, R-404A, R-410A, R-507A, R-508A, R-422A, R-417A, and HFC-134a.

In another embodiment of this invention, the refrigeration or heat transfer fluid composition comprises a perfluoropolyether and an unsaturated fluorocarbon such as 1,2,3,3,3-pentafluoro-1-propene, 1,1,3,3,3-pentafluoro-1-propene, 1,1,2,3,3-pentafluoro-1-propene, 1,2,3,3-tetrafluoro-1-propene, 2,3,3,3-tetrafluoro-1-propene, 1,3,3,3-tetrafluoro-1-propene, 1,1,2,3-tetrafluoro-1-propene, 1,1,3,3-tetrafluoro-1-propene, 1,2,3,3-tetrafluoro-1-propene, 1,1,1,2,3,4,4,4-octafluoro-2-butene, 1,1,1,2,4,4,4-heptafluoro-2-butene, 1,1,1,4,4,4-hexafluoro-2-butene, or mixtures thereof.

The present invention further relates to a method of using the refrigeration or heat transfer fluid compositions of the present invention for producing refrigeration or heating, wherein the method comprises producing refrigeration by evaporating said composition in the vicinity of a body to be cooled and thereafter condensing said composition; or producing heat by condensing said composition in the vicinity of the body to be heated and thereafter evaporating said composition.

The present invention further relates to a process for transfer of heat from a heat source to a heat sink wherein the compositions of the present invention serve as heat transfer fluids. Said process for heat transfer comprises transferring the compositions of the present invention from a heat source to a heat sink.

Heat transfer fluids are utilized to transfer, move or remove heat from one space, location, object or body to a different space, location, object or body by radiation, conduction, or convection. A heat transfer fluid may function as a secondary coolant by providing means of transfer for cooling (or heating) from a remote refrigeration (or heating) system. In some systems, the heat transfer fluid may remain in a constant state throughout the transfer process (i.e., not evaporate or condense). Alternatively, evaporative cooling processes may utilize heat transfer fluids as well.

A heat source may be defined as any space, location, object or body from which it is desirable to transfer, move or remove heat. Examples of heat sources may be spaces (open or enclosed) requiring refrigeration or cooling, such as refrigerator or freezer cases in a supermarket, building spaces requiring air-conditioning, or the passenger compartment of an automobile requiring air-conditioning. A heat sink may be defined as any space, location, object or body capable of absorbing heat. A vapor compression refrigeration system is one example of such a heat sink.

The present invention further relates to a method of using the perfluoropolyether to maintain or improve the oil return, lubrication, or energy efficiency of the refrigeration, air conditioning and heat transfer system. The method comprises adding an effective amount of perfluoropolyether into the refrigeration or air-conditioning apparatus. This may be done by mixing the perfluoropolyether with the refrigerant or heat transfer fluid compositions of this invention and then introducing the combination into the apparatus. Alternatively, this may be done by directly introducing perfluoropolyether into refrigeration or air-conditioning apparatus containing refrigerant and/or heat transfer fluid to combine in situ with the refrigerant. The resulting composition may be used in the refrigeration or air-conditioning apparatus.

The present invention further relates to a method of using the perfluoropolyether to maintain or improve the oil return, lubrication, or energy efficiency by replacing the existing refrigerants or heat transfer fluids without changing the existing lubricants in the refrigeration or air-conditioning apparatus. The method comprises removing the existing refrigerant or heat transfer fluid from the refrigeration or air-conditioning apparatus without flushing out the existing lubricant. Said refrigeration or air-conditioning apparatus is then filled with a pre-mixed composition comprising perfluoropolyether and the refrigerant or heat transfer fluid compositions of this invention.

The compositions of the present invention may be used in stationary refrigeration, air-conditioning, and heat pumps or mobile air-conditioning and refrigeration systems. Stationary air-conditioning and heat pump applications include window, ductless, ducted, packaged terminal, chillers and light commercial and commercial air-conditioning systems, including packaged rooftop. Refrigeration applications include domestic or home refrigerators and freezers, ice machines, self-contained coolers and freezers, walk-in coolers and freezers and supermarket systems, and transport refrigeration systems.

Mobile refrigeration or mobile air-conditioning systems refer to any refrigeration or air-conditioning system incorporated into a transportation unit for the road, rail, sea or air. In addition, apparatus, which are meant to provide refrigeration or air-conditioning for a system independent of any moving carrier, known as "intermodal" systems, are included in the present invention. Such intermodal systems include "containers" (combined sea/land transport) as well as "swap bodies" (combined road and rail transport). The present invention is particularly useful for road transport refrigerating or air-conditioning apparatus, such as automobile air-conditioning apparatus or refrigerated road transport equipment.

In one embodiment of this invention, the compositions of the present invention (for example, a composition comprising a mineral oil, perfluoropolyether, and a refrigeration or heat transfer fluid selected from the group consisting of R-407C, R-422A, R-417A, R-404A, R-410A, R-507A, R-508A, and HFC-134a) can be used in a heat pump with "internally enhanced heat transfer surfaces", i.e. heat pumps with fine grooves cut in a spiral or cross hatch pattern on the inside surface of the tube.

As demonstrated by the Examples below, the addition of perfluoropolyether into the refrigerant increased the oil return or energy efficiency or cooling capacity of the refrigeration or heat transfer system. In one embodiment of the invention, Krytox® 157FSH is sufficiently miscible with HFC refrigerants including R-134a, R-125, and R-32 such that the Krytox® can be blended with the refrigerant blend and charged to the refrigeration or air conditioning apparatus as a homogeneous liquid. These examples also demonstrate that the use of PFPE additives is beneficial in retrofits of existing systems to systems utilizing new refrigerant or heat transfer fluids that use POE, mineral oil or alkylbenzene lubricants.

EXAMPLES

Example 1

Miscibility of 1,1,1,2-tetrafluoroethane (HFC-134a) with representative members of the family of Krytox® perfluoropolyethers, including Krytox® 1531, Krytox® GPL-103, Krytox® 157 FSM, and Krytox® 143AZ was demonstrated by adding 1.0 gram of the PFPE to individual glass high pressure chemical bottles. Each bottle was fitted with a sealed addition valve which could be coupled to a pressure burette from which liquefied refrigerant could be added to the bottle. This was followed by adding aliquots of HFC-134a, first one gram, then about 2 grams per additional aliquot, to yield higher and higher mixing ratios of the HFC, up to a maximum of 99 grams of HFC-134a in each bottle. After each aliquot was added the bottle and its contents were swirled to mix, then observed for indication of sign of insolubility, such as the formation of haze, cloudiness, or a second liquid layer. In every case the contents of the bottle remained as one single clear liquid phase at all compositions. This showed that at room temperature, each of the perfluoropolyethers was fully soluble in the HFC-134a over a range of mixing ratios ranging from about 50% to about 1% by weight in HFC-134a.

Example 2

Baseline Refrigeration Oil Circulation tests were run in a commercial type reach-in refrigerator manufactured by Zero Zone, Inc. of 110 North Oak Ridge Drive, North Prairie, Wis., Model #2SMCP26. The Copeland compressor in the unit (Copeland Model # ARE59C3CAA-901) was fitted with an oil level indicating tube (sight glass) which showed the level of lubricating oil in the crank case of the compressor. The refrigerator was installed in a constant temperature room in which the room temperature was regulated at a constant 90 degrees Fahrenheit. In a base line run with R-22 (chlorodifluoromethane) and Suniso 4GS mineral oil, the oil level in the compressor remained constant after a small initial decrease at startup, indicating that the oil which left the compressor with the refrigerant circulated through the system and came back with the suction gas, and thereby a constant, steady state level of oil was maintained within the compressor crank case. This constant oil level assured adequate lubrication and sealing of compressor internal parts, while some small amount of oil which left the compressor with the compressed refrigerant gas circulated through the condenser, the thermal expansion valve, and the evaporator coil before returning to the compressor with the suction gas. This was indicative of normal operation of the cooling loop. Through out the duration of this 24-hour test the refrigerator maintained a constant temperature of 37 degrees Fahrenheit in the cooling zone.

Example 3 (Comparative)

The same kind of oil circulation test as described in Example 2 above was run, only this time the R-22 (chlorodifluoromethane) refrigerant had been removed and replaced with Refrigerant R-422A, a blend of HFC-125 (85.1 wt. %), HFC-134a (11.5 wt. %), and isobutane (3.4 wt. %). When this refrigerant ran in the Zero Zone refrigerator, the level of oil in the crankcase steadily decreased with time as the system operated to maintain a standard temperature of 37 degrees Fahrenheit in the refrigerated case. In a period of six hours, the oil level had dropped to the minimum allowable level within the crankcase, and the run had to be terminated to prevent compressor damage. This showed that with this combination of refrigerant and lubricant, the lubricant slowly got pumped out of the compressor and did not return.

Example 4 (Comparative)

After the oil return test described in Example 3 above was completed, the refrigerant system was flushed with R-22 (chlorodifluoromethane) to remove the excess oil from the heat exchangers, and normal base line operation was demonstrated with R-22. After the baseline re-check, once again the refrigerant R-22 was removed and replaced again with a fresh charge of R-422A and Suniso 4GS mineral oil as above, to which a small amount, equivalent to about 0.1% by weight, relative to the refrigerant charge, of the Krytox® Perfluoropolyether GPL-101 was added. The refrigerator was re-started and allowed to run as described in Example 3 above. Surprisingly, the system ran with adequate oil showing in the sight glass for 18 hours, three times longer than in Example 3, which had no added perfluoropolyether.

Example 5 (Comparative)

After the oil return test described in Example 4 above was completed, the refrigerant system was flushed with R-22 to remove the excess oil and any remaining perfluoropolyether from the heat exchangers, and normal base line operation was demonstrated with R-22 and Suniso 4GS mineral oil. After the baseline re-check, once again the refrigerant R-22 was removed and replaced again with a fresh charge of R-422A and Suniso 4GS mineral oil as above, to which a small amount, equivalent to about 0.1% by weight, relative to the refrigerant charge, of the Krytox® Perfluoropolyether 157FSL was added. The refrigerator was re-started and allowed to run as described in Example 3 above. Surprisingly, the system ran with adequate oil showing in the sight glass for 24 hours, four times longer than in Example 3, which had no added perfluoropolyether. There was still an adequate oil level showing in the sight glass when the run was terminated.

Example 6 (Comparative)

The ZeroZone commercial reach in refrigerator described above was re-fitted with a thermal expansion valve to allow it to operate with the HFC refrigerant R-404A (a blend of 44 wt. % of HFC-125, 52 wt. of HFC-143a and 4 wt. % of HFC-134a) and Suniso 4GS mineral oil. This refrigerator was operated at an internal box temperature of 38 degrees Fahrenheit while energy consumption was monitored. As before, the test was conducted with the refrigerator in a constant temperature room that was controlled at a constant temperature of 90 degrees Fahrenheit. During a three-hour test period the power consumption of the refrigerator was measured to be at a rate of 22.65 Kilowatt hours per day.

Example 7 (Comparative)

The Test set up described in example 6 above was modified by removing the refrigerant charge, and re-charging with a mixture of refrigerant R-404A and Suniso 4GS mineral oil which contained 0.2% by weight, relative to the refrigerant charge, of Krytox® 157 FSH. The test chamber was stabilized again at 90 degrees, and the refrigerator was allowed to operate. Over a three-hour period the internal box temperature was maintained at 37.6 degrees Fahrenheit. The average power use by the refrigerator during this test period was measured to be at a rate of 21.83 Kilowatt hours per day. This was 3.6% less power usage than was measured in Example 6, when no Krytox® was in the refrigerant.

Example 8

Boundary Layer Lubrication tests were run using a FALEX Pin on vee-block test geometry, according to test protocol based on the ASTM 2670-95 Load to Failure test method. In this test, a rotating steel pin was squeezed between two standard blocks of aluminum metal. The aluminum blocks were made with vee shaped notches in them, and they were mounted in a bracket such that the vee notches contacted the steel pin. The pin and block assembly was immersed in a pan of lubricant and a motor coupled through a torque meter rotated the pin. The blocks were adjusted to lightly contact the surface of the rotating pin at a low load of 250-pounds pressure for an initial run-in period of five minutes. The force load applied to the blocks was then increased slowly at a steady rate of 200 more pounds each minute by a mechanical tightener that squeezed the rotating pin between the two vee blocks. The load was increased to some predetermined limit, or until a mechanical failure of one of the test pieces occurred. With pure Suniso 4GS mineral oil, the test failed within the first minute, while the mechanical load on the pin and block assembly was only 250 lb. Surprisingly, when this test was repeated with a mixture of 0.5% by weight of Krytox® 157 FSL dispersed in the Suniso 4GS mineral oil, the test continued to run for 9 minutes, during which time the mechanical load had increased to a level of 2100 pounds. By this time the mechanical parts had not failed, but the level of smoke being generated became excessive, so the test was terminated. This showed that the presence of small amount of Krytox® 157 FSL dispersed in the mineral oil increased the load carrying ability of the mineral oil at boundary lubrication conditions by more than 800%.

Example 9

A split system Carrier heat pump was used to evaluate refrigerant and lubricant performance in air conditioning and heating modes. The system consisted of a condensing unit, Model 38YXA030, and an evaporator Unit, Model FX4ANF030, and was rated at a nominal cooling capacity of 2½ tons of cooling with R-410A. The system was operated inside of a dual chamber psychrometric chamber, with one chamber regulated at outdoor conditions per standard ARI 210/240 Cooling A test conditions, and the other chamber regulated at Cooling A indoor test conditions. This unit was also modified so that the compressor could be changed from the standard R-410A rated compressor to a compressor sized for operation with R-407C. In the tests cited in Table 4 below, runs 1, 2, and 3 were made using the R-410A compressor. Runs 4, 5, 6, and 7 were made with the R-407C compressor.

The copper tubing in the evaporator and condenser coils of this air conditioning system came from the factory with a feature called "internally enhanced heat transfer surfaces", a feature which is generally known and used throughout the industry. This feature includes fine grooves cut in a spiral or cross hatch pattern on the inside surface of the tube. These grooves cause disruption of the laminar flow layers near the tube surface. The result of this disruption is believed to be improved heat transfer from the evaporating refrigerant within the copper tubes to the tubes themselves and the attached fins that comprise the evaporator unit. Heat transfer to the air flowing through the fins of the evaporator is believed to be thereby improved, with the creation of a more energy efficient air conditioning or heating process. Again, the use of internally enhanced tube surfaces is well known and widely applied within the air conditioning and heat pump industries. Most high efficiency systems employ enhanced surface tubing in evaporators and condensers.

It has been observed that when a lubricant that is not miscible with the refrigerant is used in such an enhanced system, that the performance improvement normally imparted by the enhanced tube surface is lost. It is believed that the non-miscible lubricant is drawn into the fine grooves by capillary action, effectively creating a smoother surface. This smoother surface is believed to cause at least a partial return to the less efficient laminar flow of the refrigerant within the tube. Further, the layer of oil on the tube surface is believed to reduces the ability of the copper tube to allow heat transfer, further reducing operating efficiency. As shown in Table 4, the addition of a small amount of PFPE to the refrigerant in our heat pump system will substantially reduce the deficit in performance which results from the use of a non miscible lubricant, such as mineral oil, with an HFC refrigerant such as R-410A or R-407C. This ability of the heat pump to operate with HFC refrigerant and non miscible mineral oil with excellent efficiency is shown by the data in Table 4 below.

TABLE 4

Impact of adding PFPE to Carrier Heat Pump

| Run # | Refrigerant | Lubricant | Additive | EER | EER Delta vs. POE | Capacity kBTU/h | Capacity Delta vs. POE |
|---|---|---|---|---|---|---|---|
| 1 | 410A | 32-3MA | none | 12.8 | | 28.6 | |
| 2 | 410A | 3GS | none | 11.1 | 87.2 | 25.0 | 87.4 |
| 3 | 410A | 3GS | 0.2% 157 FSL | 12.5 | 97.9 | 28.1 | 98.5 |
| 4 | R-407C | RL32H | none | 11.2 | | 27.8 | |
| 5 | R-407C | 3GS | none | 10.8 | 96.7 | 26.6 | 95.5 |
| 6 | R-407C | 3GS | 1% 157 FSL | 11.0 | 98.3 | 27.6 | 99.0 |
| 7 | R-407C | RL32H | 1% 157 FSL | 11.3 | 101.0 | 27.6 | 99.2 |

These POE lubricants are miscible with the refrigerants used in the example. The lubricant 3GS is a commercial naphthenic mineral oil available from Sonneborn, Inc. The mineral oil lubricant is not miscible with HFC refrigerants.

In Table 4, note that when the non miscible lubricant Suniso 3GS, a mineral oil, is used with HFC refrigerant R-410A, (Run #2) the EER is reduced by 12.8%, and the capacity reduced by 12.6%, versus Run #1 with POE lubricant. However, when a small amount of the PFPE Krytox® 157 FSL is added to the refrigerant (Run #3) that the EER is restored to within about 2.1% of that achieved with POE, and the capacity is restored to within about 1.5% of that achieved with POE. The deficits caused by the use of the non-miscible mineral oil are almost completely eliminated by the use of PFPE.

Further note in Table 4 that with HFC refrigerant R-407C, when mineral oil is used the efficiency and capacity are reduced by about 3.3% and 4.5%, respectively versus POE. (Runs 4 and 5). In Run #6 it is seen that the addition of 1% Krytox® 157 FSL increases the EER and capacity to within 1.7% and 1.0%, respectively, of the values obtained with the POE lubricant. Again, the deficits caused by using non-miscible lubricant are largely eliminated by the use of the PFPE.

Finally note that when Krytox 157 FSL was added to the R-407C and POE system (Run 6) that the EER was improved to be 1% better than that obtained in Run 4 with no PFPE, and the capacity was within 1% of Run 4, the POE baseline case.

Example 10

In a similar manner to Example 9, a split system Carrier Heat Pump was used to measure performance of several compositions as disclosed herein as compared to compositions with no perfluoropolyether additive. The unit was a residential-type heat pump unit manufactured by Carrier Corp. (Model #38YXA030) with a Carrier Air Handler (Model # FX4ANF030). The Copeland Scroll compressor (Model # ZR28K3-PFV) was fitted with an oil level indicating tube (sight glass) which showed the level of lubricating oil in the crank case of the compressor.

The outdoor (Model #38YXA030 from above) and indoor (Model# FX4ANF030) units were installed in temperature and humidity controlled environmental chambers and tested per ARI Standard 210/240. Per the "A" Cooling Steady State Test in the standard, the outdoor room temperature was controlled to 95° F. dry bulb and 75° F. wet bulb temperature and the indoor unit was controlled to 80° F. dry bulb and 67° F. wet bulb temperature. The amount of superheat was controlled at a constant 20 degrees F. The charge size for the lubricant was a constant 1200 mL as recommended on the compressor nameplate. Data was collected for 2 hours for each test at steady state conditions and oil level in the sight glass was monitored at regular intervals.

The refrigerant composition tested was a mixture of 62.3 weight percent HFC-1225ye, 24 weight percent HFC-32, and 13.7 weight percent HFC-125 as combined with either Suniso 3GS mineral oil or RL32-3MAF POE lubricants and Krytox® GPL-104 additive. The results are listed in Table 5.

TABLE 5

| Run # | Lubricant | Additive | EER | EER, % of POE | Capacity (KBtu/hr) | Capacity, % of POE |
|---|---|---|---|---|---|---|
| 1 | RL32-3MAF | none | 10.4 | 100.0% | 25.0 | 100.0% |
| 2 | RL32-3MAF | 0.2% GPL-104 | 10.6 | 102.1% | 24.7 | 99.0% |
| 3 | 3GS | none | 10.1 | 97.1% | 23.9 | 95.6% |
| 4 | 3GS | 0.2% GPL-104 | 10.4 | 99.9% | 24.9 | 99.5% |

In Table 5, note that when the non-miscible mineral oil Suniso 3GS lubricant is used with the HFC refrigerant (Run#3), the energy efficiency (EER) is reduced 2.9% and the capacity is reduced 4.4% when compared to the miscible POE RL32-3MAF lubricant (Run#1). However, when a small amount of Krytox® GPL-104 PFPE is added to the 3GS system (Run#4), the energy efficiency is restored to within 0.1% and the capacity is restored to within 0.5% of the values for the POE. The deficits caused by the use of the non-miscible mineral oil lubricant are almost completely eliminated by the use of the PFPE additive.

Further, addition of the PFPE to the POE system also shows an improvement in energy efficiency of 2.1% with minimal reduction in capacity.

The many features and advantages of the present invention are apparent from the detailed description above, and thus it is intended that the appended claims cover all such features and advantages which fall within the spirit and scope of the invention. In short, the foregoing description is illustrative of the invention, and is not intended to imply limitations thereupon. For example, where a numerical range is listed above, it is intended that the range include and herein expressly disclose all numbers between the upper and lower limits, such that the range of from about 1 to about 10 would include also the numbers 2, 3, 4, 5, 6, 7, 8 and 9. Numerous modifications and variations will readily occur to those skilled in the art, and it is not desired to limit the invention to the exact composition, method and uses described above, and accordingly, all suitable modifications and equivalents may be resorted to and fall within the scope of the invention described in the claims.

What is claimed is:

1. A method of producing refrigeration, said method comprising evaporating a composition in the vicinity of a body to be cooled and thereafter condensing said composition; wherein said composition consists of:
   a. a refrigerant or heat transfer fluid consisting of 2,3,3,3-tetrafluoro-1-propene ($CH_2$=$CFCF_3$) or 1,3,3,3-tetrafluoro-1-propene (CHF=$CHCF_3$); and
   b. at least one perfluoropolyether; and optionally
   c. a lubricant oil which is mineral oil or synthetic oil selected from the group consisting of alkylbenzene, polyol ester, polyalkylene glycols, polyvinyl ethers, carbonates, polyalphaolefin and combinations thereof;
wherein said perfluoropolyether has two end groups; wherein each of the two end groups of the perfluoropolyether, independently, is either an unfunctionalized, branched or straight chain perfluoroalkyl radical, or a functionalized group selected from the group consisting of esters, hydroxyls, amines, amides, cyanos, carboxylic acids and sulfonic acids; and wherein said evaporating and said condensing is in a mobile air-conditioning system.

2. The method of claim 1, wherein the amount of perfluoropolyether in said composition is less than about 40% by weight relative to said refrigerant or heat transfer fluid.

3. The method of claim 1, wherein at least one of the end groups of said perfluoropolyether is carboxylic acid.

4. The method of claim 1, wherein at least one of the end groups of said perfluoropolyether is sulfonic acid.

5. The method of claim 1, wherein the mobile air-conditioning system is an automobile air-conditioning apparatus.

* * * * *